(12) United States Patent
Takahashi et al.

(10) Patent No.: US 12,447,879 B2
(45) Date of Patent: Oct. 21, 2025

(54) POROUS STRUCTURE AND METHOD FOR MANUFACTURING POROUS STRUCTURE

(71) Applicant: Archem Inc., Tokyo (JP)

(72) Inventors: Yoshiyuki Takahashi, Tokyo (JP);
Toshimitsu Shinohara, Tokyo (JP);
Yukiko Yamaguchi, Tokyo (JP);
Satoshi Ienaga, Tokyo (JP)

(73) Assignee: Archem Inc., Tokyo (JP)

( * ) Notice: Subject to any disclaimer, the term of this patent is extended or adjusted under 35 U.S.C. 154(b) by 402 days.

(21) Appl. No.: 18/004,449

(22) PCT Filed: May 12, 2021

(86) PCT No.: PCT/JP2021/018114
§ 371 (c)(1),
(2) Date: Mar. 17, 2023

(87) PCT Pub. No.: WO2022/009516
PCT Pub. Date: Jan. 13, 2022

(65) Prior Publication Data
US 2023/0294578 A1    Sep. 21, 2023

(30) Foreign Application Priority Data
Jul. 8, 2020    (JP) .................................. 2020-117991

(51) Int. Cl.
*B60N 2/70*    (2006.01)
*B33Y 80/00*    (2015.01)
*B33Y 10/00*    (2015.01)

(52) U.S. Cl.
CPC ............ *B60N 2/7017* (2013.01); *B33Y 80/00* (2014.12); *B33Y 10/00* (2014.12)

(58) Field of Classification Search
None
See application file for complete search history.

(56) References Cited

U.S. PATENT DOCUMENTS 3,499,822 A * 3/1970 Ole-Bendt ................ D01F 6/00
                                                              442/351
4,337,130 A    6/1982 Ahramjian
(Continued)

FOREIGN PATENT DOCUMENTS

CN    107310161 A    11/2017
JP    H02645 A       1/1990
(Continued)

OTHER PUBLICATIONS

Aug. 21, 2024, search result of Office Action issued by the China National Intellectual Property Administration in the corresponding Chinese Patent Application No. 202180048059.6.
(Continued)

*Primary Examiner* — Chinessa T. Golden
(74) *Attorney, Agent, or Firm* — KENJA IP LAW PC

(57) ABSTRACT

A porous structural body 1 is a porous structural body made of flexible resin or rubber, the porous structural body including a skeleton part 2 throughout an entirety thereof, wherein the skeleton part includes: a plurality of bone parts 2B; and a plurality of connection parts 2J that connect end portions of the plurality of bone parts, and wherein the porous structural body is configured such that a plurality of portions of the skeleton part interfere with each other when the porous structural body is compressed to deform in a predetermined weight input direction.

17 Claims, 18 Drawing Sheets

(56) References Cited

U.S. PATENT DOCUMENTS

| | | | |
|---|---|---|---|
| 4,877,661 A | 10/1989 | House et al. | |
| 10,357,955 B2 | 7/2019 | Ziolek | |
| 2017/0305093 A1 | 10/2017 | Ziolek | |
| 2018/0070736 A1* | 3/2018 | Achten | B29C 64/106 |
| 2019/0194943 A1 | 6/2019 | Bingham | |
| 2022/0024364 A1 | 1/2022 | Itabashi | |
| 2022/0055266 A1 | 2/2022 | Iizuka | |

FOREIGN PATENT DOCUMENTS

| | | | |
|---|---|---|---|
| JP | 2019534064 A | 11/2019 |
| JP | 6633174 B1 | 1/2020 |
| JP | 6644183 B1 | 2/2020 |
| WO | 2018050558 A1 | 3/2018 |
| WO | 2019066659 A2 | 4/2019 |
| WO | 2019235544 A1 | 12/2019 |
| WO | 2019235545 A1 | 12/2019 |
| WO | 2019235546 A1 | 12/2019 |
| WO | 2019235547 A1 | 12/2019 |
| WO | 2020116325 A1 | 6/2020 |
| WO | 2020116327 A1 | 6/2020 |
| WO | 2020116328 A1 | 6/2020 |

OTHER PUBLICATIONS

Jan. 10, 2023, International Preliminary Report on Patentability issued in the International Patent Application No. PCT/JP2021/018114.

Aug. 3, 2021, International Search Report issued in the International Patent Application No. PCT/JP2021/018114.

* cited by examiner

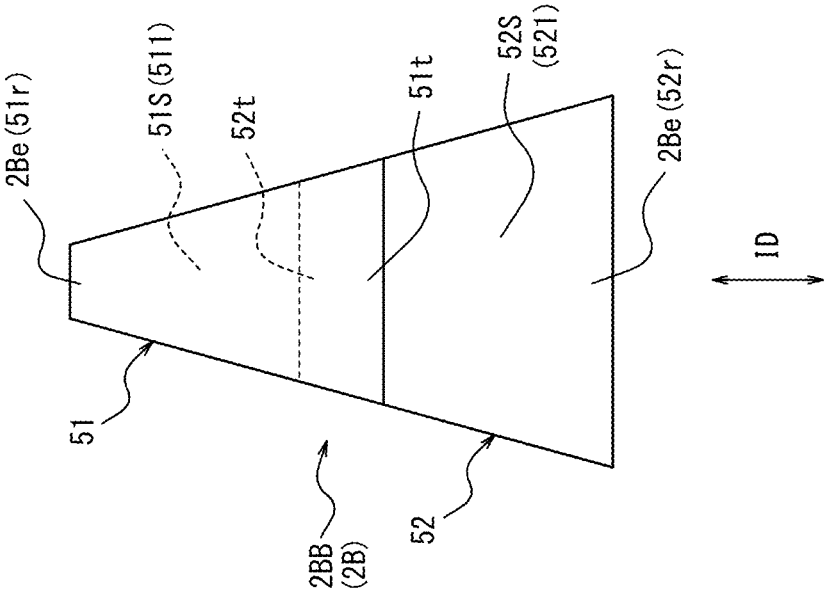
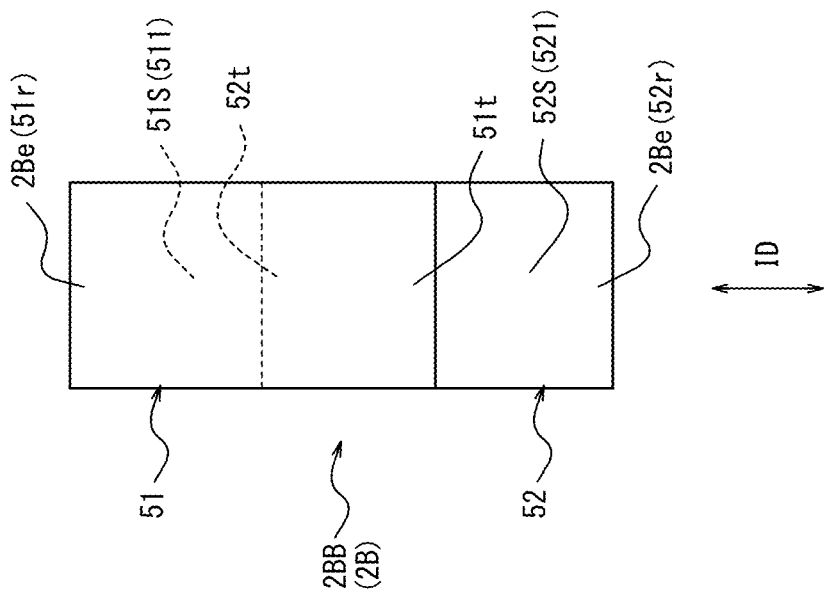

FIG. 18
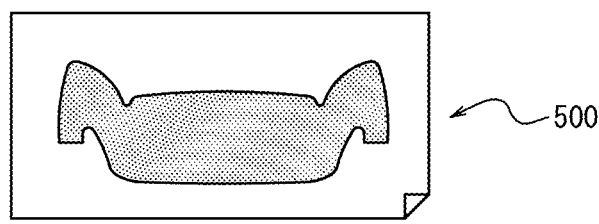
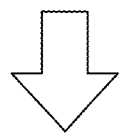
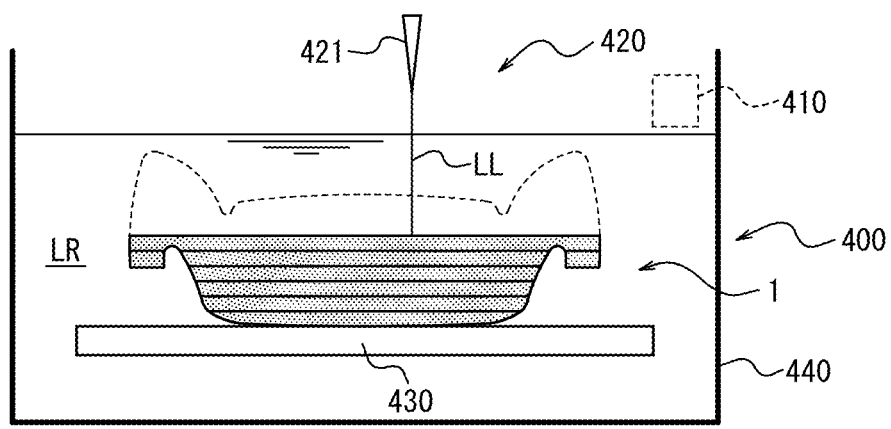
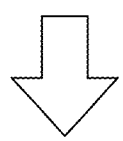
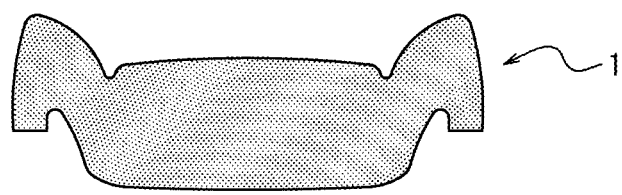

POROUS STRUCTURE AND METHOD FOR MANUFACTURING POROUS STRUCTURE

TECHNICAL FIELD

The present disclosure relates to a porous structural body and a method for manufacturing the porous structural body.

The present application is based on and claims the benefit of priority from the Japanese Patent Application No. 2020-117991, filed on Jul. 8, 2020, the entire contents of which are incorporated hereby by reference.

BACKGROUND

Porous structural bodies (for example, urethane foam) with cushioning characteristics have been manufactured through processes of foaming by chemical reactions in, for example, metallic molding.

Meanwhile, in recent years, porous structural bodies with cushioning characteristics that can be easily manufactured using 3D printers have been proposed (for example, Patent Literatures 1 and 2, which are hereinafter referred to as PTLS 1 and 2).

CITATION LIST

Patent Literatures

PTL 1: WO 2019235544 A1
PTL 2: WO 2019235547 A1

SUMMARY

Technical Problem

The technology of PTLS 1 and 2, however, has room for increasing the degree of freedom to adjust dynamic characteristics of porous structural bodies.

It would be helpful to provide a porous structural body and a method for manufacturing the porous structural body that can increase the degree of freedom to adjust dynamic characteristics of the porous structural body.

Solution to Problem

A porous structural body according to the present disclosure is
a porous structural body made of flexible resin or rubber, the porous structural body including
a skeleton part throughout an entirety thereof, wherein the skeleton part includes:
a plurality of bone parts; and
a plurality of connection parts that connect end portions of the plurality of bone parts, and wherein
the porous structural body is configured such that a plurality of portions of the skeleton part interfere with each other when the porous structural body is compressed to deform in a predetermined weight input direction.

A method for manufacturing the porous structural body according to the present disclosure, the method including
manufacturing the porous structural body using a 3D printer.

Advantageous Effect

According to the present disclosure, a porous structural body and a method for manufacturing the porous structural body that can increase the degree of freedom to adjust dynamic characteristics of the porous structural body can be provided.

BRIEF DESCRIPTION OF THE DRAWINGS

In the accompanying drawings:

FIG. 7A illustrates a first modification of the non-continuous bone part in the porous structural body according to the second embodiment of the present disclosure, and FIG. 7B illustrates a second modification of the non-continuous bone part in the porous structural body according to the second embodiment of the present disclosure;

FIG. 18 illustrates a method for manufacturing the porous structural body according to an embodiment of the present disclosure that can be used to manufacture a porous structural body according to any embodiment of the present disclosure.

DETAILED DESCRIPTION

Figure 1:
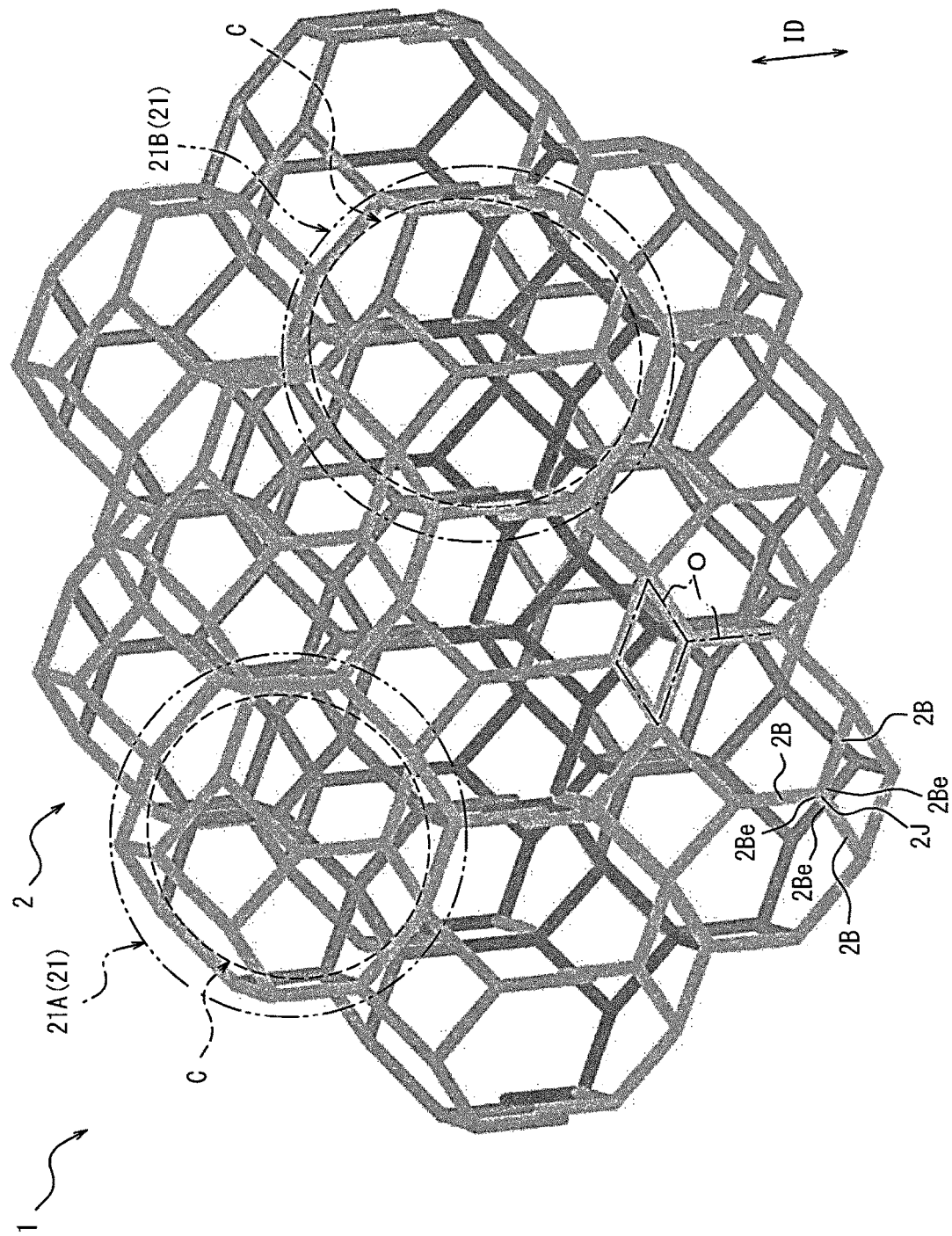
FIG. 1 is a perspective view illustrating part of a porous structural body according to a first embodiment of the present disclosure in a natural state in which compressive deformation has not occurred.

A porous structural body and a method for manufacturing the porous structural body are suitable for use in cushion members, e.g. for use in any vehicle seat and any vehicle seat pad (seat pad), and are particularly suitable for use in car seats and car seat pads.

Embodiments of a porous structural body and a method for manufacturing the porous structural body according to the present disclosure will be described by way of examples below with reference to the drawings.

In the drawings, the same components are denoted by the same reference numerals.

First Embodiment of Porous Structural Body

First, a porous structural body 1 according to a first embodiment of the present disclosure will be described with reference to FIGS. 1 to 5B. FIGS. 1 to 4B illustrate part of the porous structural body 1 according to the present embodiment in a natural state. Here, the "natural state" refers to a state in which no external force is applied and, consequently, no compressive deformation or like has occurred. FIGS. 5A, 5B illustrate part of the porous structural body 1 according to the present embodiment in a state in which compressive deformation has occurred in a predetermined weight input direction ID.

The porous structural body 1 is shaped by a 3D printer. A method of manufacturing the porous structural body 1 will be described in detail later with reference to FIG. 18. By manufacturing the porous structural body 1 using a 3D printer, the manufacturing is simpler and an expected configuration is formed, compared with a conventional process of foaming by chemical reaction. It is also expected that upcoming technological advances in 3D printers will enable manufacturing by 3D printers to be achieved in a shorter time and at a lower cost in the future. Moreover, by manufacturing the porous structural body 1 using a 3D printer, the configuration of the porous structural body 1 corresponding to various required characteristics can be achieved easily and as expected.

The porous structural body 1 is made of flexible resin or rubber.

Here, the "flexible resin" refers to resin that can deform when weight is applied, and for example, elastomer-based resin is preferable, and polyurethane is more preferable. The rubber includes natural or synthetic rubber. Since the porous structural body 1 is made of flexible resin or rubber, it can undergo compressive deformation and restoration in response to the addition and release of weight from a user, so that it can have cushioning characteristics.

From the viewpoint of ease of manufacture using a 3D printer, it is more preferable when the porous structural body 1 is made of flexible resin than when it is made of rubber.

From the viewpoint of ease of manufacture using a 3D printer, it is also preferable when the entire porous structural body 1 is made of materials of the same composition. The porous structural body 1 may, however, also be made of materials of different compositions depending on the parts.

In a case in which the porous structural body 1 is manufactured using a 3D printer, resin made from light-curable polyurethane (in particular UV-curable polyurethane) can be used as a material forming the porous structural body 1. As light-curable polyurethane (in particular UV-curable polyurethane), resins made from urethane acrylate or urethane methacrylate can be used. Examples of such resins include those described in U.S. Pat. No. 4,337,130.

The porous structural body 1 includes a skeleton part 2 that forms the framework of the porous structural body 1. The skeleton part 2 defines a large number of cell holes C. The skeleton part 2 is present throughout the entirety of the porous structural body 1, and it is made of flexible resin or rubber. In the present embodiment, part of the porous structural body 1 other than the skeleton part 2 is a void space. In other words, the porous structural body 1 includes only the skeleton part 2.

As illustrated in FIG. 1, the skeleton part 2 of the porous structural body 1 includes a plurality of bone parts 2B and a plurality of connection parts 2J throughout its entirety. As illustrated in FIGS. 2 to 4B, in the present embodiment, some (one or more) bone parts 2B in the plurality of bone parts 2B included in the skeleton part 2 are continuous bone parts 2BA, each of which is continuous throughout its entirety, and the remaining (one or more) bone parts 2B in the plurality of bone parts 2B included in the skeleton part 2 are non-continuous bone parts 2BB, each of which is divided into two parts (later-described first and second split bone parts 51, 52). Each continuous bone part 2BA is configured in a columnar shape. Each bone part 2B extends from one end portion 2Be to another end portion 2Be.

Figure 3:
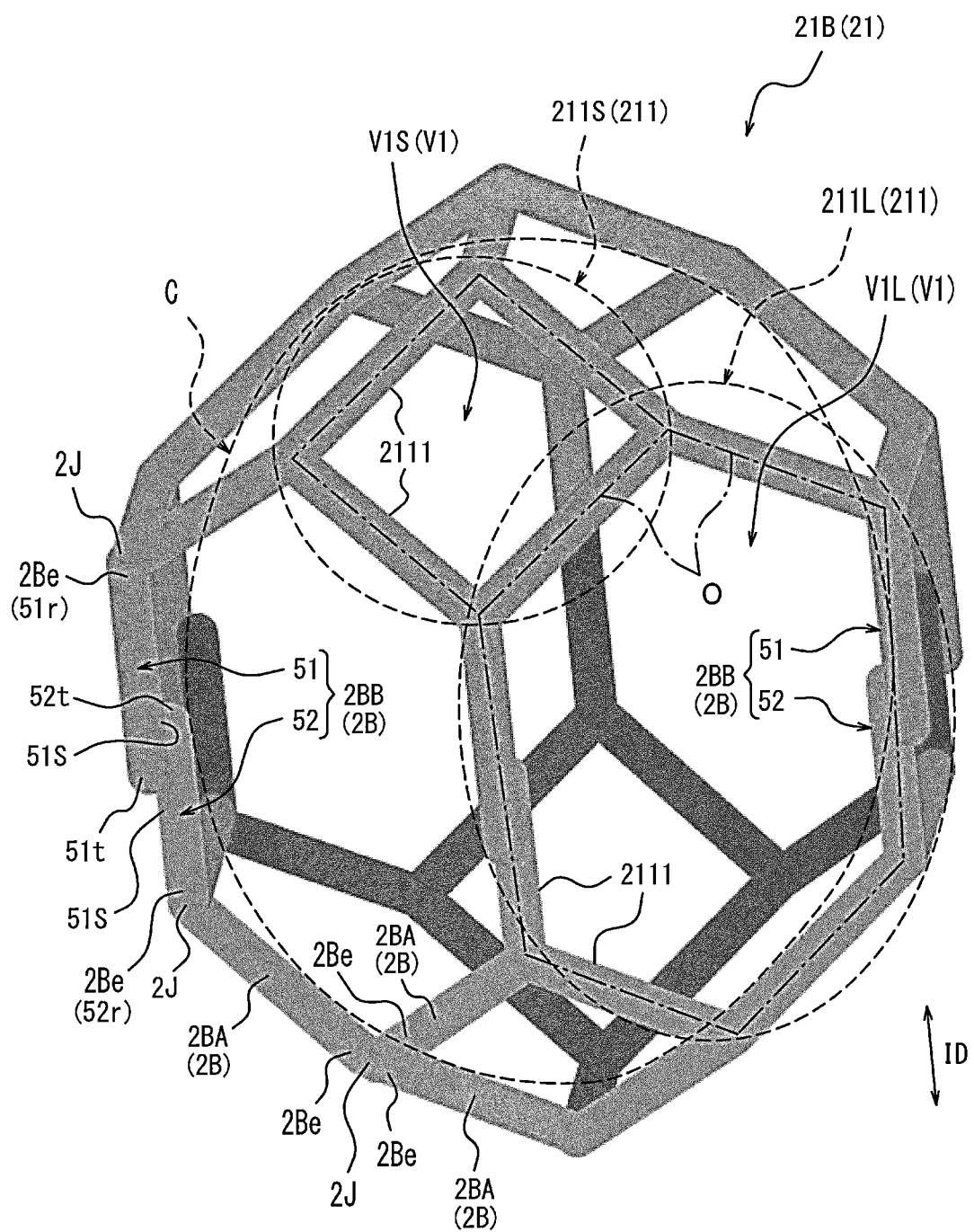
FIG. 3 is a perspective view illustrating a cell defining part with non-continuous bone parts in the porous structural body of FIG. 1.

As illustrated in FIG. 3, one end portion 51r of the first split bone part 51 forms one end portion 2Be of the bone part 2B and will be referred to below as "root portion 51r" for convenience. Another end portion 51t of the first split bone part 51 is not coupled to any other portion of the skeleton part 2 and will be referred to below as "tip portion 51t" for convenience. One end portion 52r of the second split bone part 52 forms another end portion 2Be of the bone part 2B and will be referred to below as "root portion 52r" for convenience. Another end portion 52t of the second split bone part 52 is not coupled to any other portion of the skeleton part 2 and will be referred to below as "tip portion 52t" for convenience.

In the description of the bone parts 2B herein, it is assumed that both the first and second split bone parts 51, 52 together form each non-continuous bone part 2BB, regardless of whether the first and second split bone parts 51, 52 are in contact with each other in their natural state.

The connection parts 2J connect the end portions 2Be of the plurality of (e.g. three) bone parts 2B extending in different directions, at the respective locations where two end portions 2Be in the directions of extension of the respective bone parts 2B are adjacent to each other.

Because the skeleton part 2 includes the plurality of bone parts 2B and the plurality of connection parts 2J throughout its entirety, it has a mesh pattern.

The skeleton part 2 is preferably configured in its entirety as a single piece (i.e. includes one component), but it may also be configured with a plurality of components that are separate from each other.

In FIGS. 1 to 4B, skeleton lines O of the skeleton part 2 are illustrated in some parts of the porous structural body 1 by single dotted lines. The skeleton lines O of the skeleton part 2 include skeleton lines O of the bone parts 2B and skeleton lines O of the connection parts 2J. The skeleton line O of each bone part 2B is the central axis of the bone part 2B. The central axis of the bone part 2B is a line that smoothly connects the center of gravity of the shape formed by the bone part 2B at each point in the direction of extension of the bone part 2B in a cross-section perpendicular to the direction of extension of the bone part 2B. Additionally, the central axis of a non-continuous bone part 2BB is a line that smoothly connects the center of gravity of the shape formed by the non-continuous bone part 2BB at each point in the direction of extension of the non-continuous bone part 2BB in the cross-section perpendicular to the direction of extension of the non-continuous bone part 2BB when the first and second split bone parts 51, 52 are viewed together as a single part. The skeleton line O (central axis) of the non-continuous bone part 2BB can be different from the respective central axes of the first and second split bone parts 51, 52. The central axis of the first split bone part 51 is a line that smoothly connects the center of gravity of the shape formed by the first split bone part 51 at each point in the direction of extension of the first split bone part 51 in a cross-section perpendicular to the direction of extension of the first split bone part 51. The central axis of the second split bone part 52 is a line that smoothly connects the center of gravity of the shape formed by the second split bone part 52 at each point in the direction of extension of the second split bone part 52 in a cross-section perpendicular to the direction of extension of the second split bone part 52. The direction of extension of each bone part 2B is the skeleton line O of the bone part 2B (part of the skeleton line O corresponding to the bone part 2B, and the same applies hereinafter). The skeleton line O of each connection part 2J is an extension line part obtained by smoothly extending the central axes of bone parts 2B connected by the connection part 2J into the connection part 2J and coupling them with each other.

The porous structural body 1, which includes the skeleton part 2 substantially throughout its entirety, can undergo compressive deformation and restoration in response to the addition and release of weight, while ensuring breathability, thereby providing excellent characteristics as a cushion member.

In the present embodiment, each continuous bone part 2BA is columnar and also extends in a straight line (FIGS. 1 to 4B). Additionally, in the present embodiment, each first split bone part 51 and each second split bone part 52 are columnar and also extend in a straight line (FIGS. 1 to 4B). Accordingly, each non-continuous bone part 2BB is columnar and also extends in a straight line.

It is to be noted, however, that some or all continuous bone parts 2BA in the continuous bone parts 2BA included in the skeleton part 2 may extend in a curved manner. In this case, the curvature of some or all of the continuous bone parts 2BA prevents sudden shape changes of the continuous bone parts 2BA and thus the porous structural body 1 during weight input, and prevents local buckling. From the same viewpoint, some or all first split bone parts 51 in the first split bone parts 51 included in the skeleton part 2 may extend in a curved manner. Similarly, some or all second split bone parts 52 in the second split bone parts 52 included in the skeleton part 2 may extend in a curved manner. Likewise, some or all non-continuous bone parts 2BB in the non-continuous bone parts 2BB included in the skeleton part 2 may extend in a curved manner.

In these examples, each of the continuous bone parts 2BA included in the skeleton part 2 has substantially the same shape and length (FIGS. 1 to 4B). The present disclosure is, however, not limited to these examples, and the shape and/or length of each of the continuous bone parts 2BA included in the skeleton part 2 does not need to be the same. For example, the shape and/or length of some continuous bone parts 2BA may be different from other continuous bone parts 2BA. In this case, the shape and/or length of the continuous bone parts 2BA in a particular portion of the skeleton part 2 may be intentionally different from other portions, so as to obtain different mechanical characteristics.

In these examples, the width W0 (FIG. 4A) and cross-sectional area of each continuous bone part 2BA are constant (i.e. uniform along the direction of extension of the continuous bone part 2BA) over the entire length of the continuous bone part 2BA (FIGS. 1 to 4B).

The cross-sectional area of the continuous bone part 2BA refers to a cross-sectional area of the continuous bone part 2BA perpendicular to the skeleton line O (central axis) of the continuous bone part 2BA. The width W0 of the continuous bone part 2BA (FIG. 4A) refers to the maximum width of the continuous bone part 2BA measured along the cross-section perpendicular to the skeleton line O of the continuous bone part 2BA.

In the examples described herein, however, some or all continuous bone parts 2BA in the continuous bone parts 2BA included in the skeleton part 2 may each have a non-uniform width W0 and/or cross-sectional area along the direction of extension of the continuous bone part 2BA. For example, each of some or all continuous bone parts 2BA in the continuous bone parts 2BA included in the skeleton part 2, in some portions including the end portions 2Be on its both sides in the direction of extension of the continuous bone part 2BA, may have a width W0 that gradually increases or decreases toward the both ends in the direction of extension of the continuous bone part 2BA. Furthermore, each of some or all continuous bone parts 2BA in the continuous bone parts 2BA included in the skeleton part 2, in some portions including the end portions 2Be on its both sides in the direction of extension of the continuous bone part 2BA, may have a cross-sectional area that gradually increases or decreases toward the both ends in the direction of extension of the continuous bone part 2BA.

Herein, "gradually changing (increasing or decreasing)" refers to constantly changing (increasing or decreasing) smoothly without becoming constant in the middle.

Figure 4A:
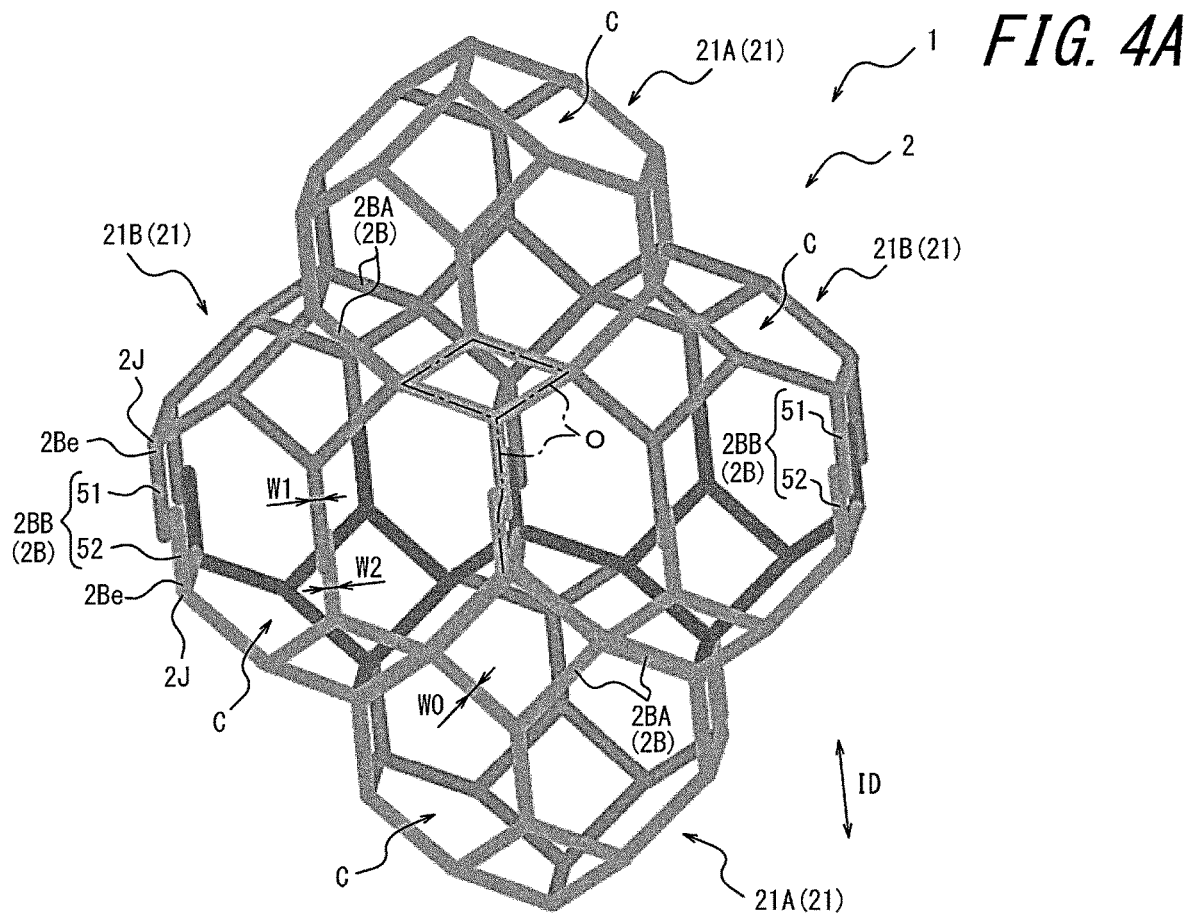
FIG. 4A is a perspective view illustrating part of the porous structural body of FIG. 1 in the natural state in which compressive deformation has not occurred.
Figure 5A:
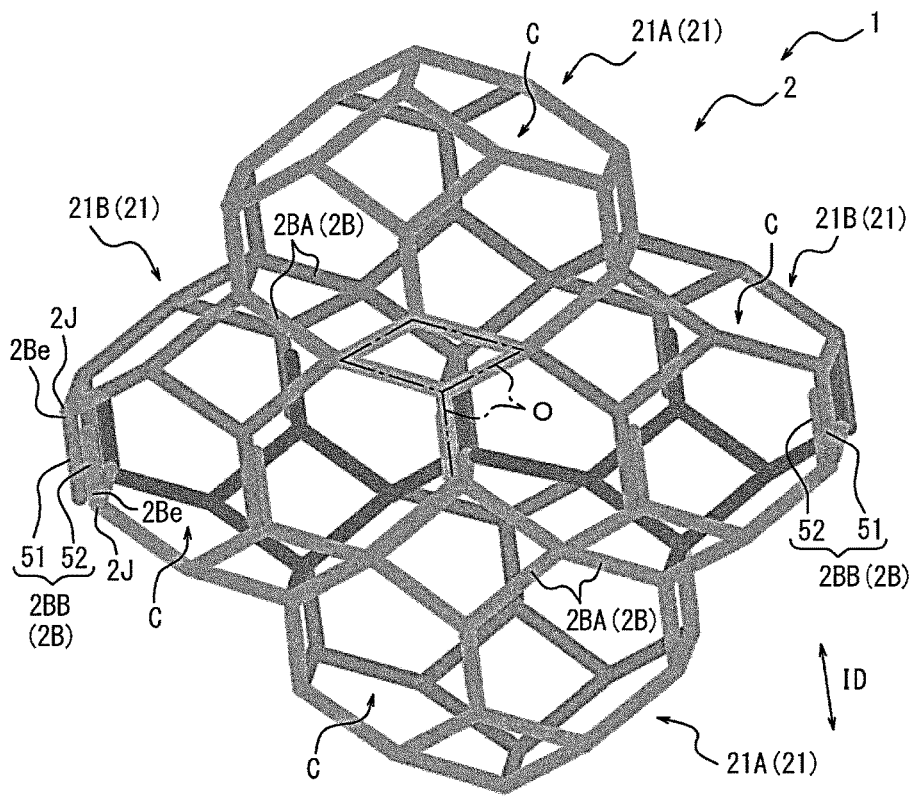
FIG. 5A is a perspective view illustrating part of the porous structural body of FIG. 1 in a state in which compressive deformation has occurred in a predetermined weight input direction.
Figure 5B:
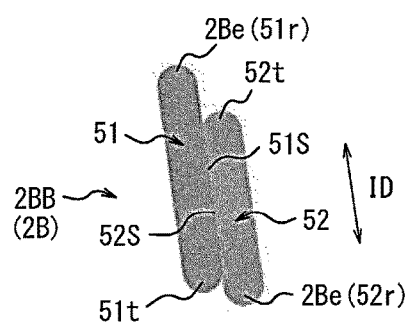
FIG. 5B illustrates a non-continuous bone part in the porous structural body in the state of FIG. 5A.

Similarly, in these examples, the width W1 (FIG. 4A) and cross-sectional area of each first split bone part 51 are constant (i.e. uniform along the direction of extension of the first split bone part 51) over the entire length of the first split bone part 51 (FIGS. 1, 3 and 4A). Furthermore, in these examples, the width W2 (FIG. 4A) and cross-sectional area of each second split bone part 52 is constant over the entire length of the second split bone part 52 (i.e. uniform along the direction of extension of the second split bone part 52) (FIGS. 1, 3, and 4A).

The cross-sectional area of the first split bone part 51 refers to a cross-sectional area of the first split bone part 51 perpendicular to the central axis of the first split bone part 51. The cross-sectional area of the second split bone part 52 refers to a cross-sectional area perpendicular to the central axis of the second split bone part 52. The width W1 of the first split bone part 51 (FIG. 4A) refers to the maximum width of the first split bone part 51 measured along the cross-section perpendicular to the central axis of the first split bone part 51. The width W2 of the second split bone part 52 (FIG. 4A) refers to the maximum width of the second split bone part 52 measured along the cross-section perpendicular to the central axis of the second split bone part 52.

In the examples described herein, however, some or all first split bone parts 51 in the first split bone parts 51 included in the skeleton part 2 may each have a non-uniform width W1 and/or cross-sectional area along the direction of extension of the first split bone part 51. Furthermore, in the examples described herein, some or all second split bone parts 52 in the second split bone parts 52 included in the skeleton part 2 may each have a non-uniform width W2 and/or cross-sectional area along the direction of extension of the second split bone part 52.

In the examples described herein, from the viewpoint of simplification of the configuration of the skeleton part 2 and thus ease of manufacturing the porous structural body 1 by a 3D printer, the minimum value of the width W0 of each continuous bone part 2BA (FIG. 4A) is preferably 0.05 mm or more, and more preferably 0.10 mm or more. When the minimum value of the width W0 is 0.05 mm or more, it can be shaped with the resolution of high-performance 3D printers, and when it is 0.10 mm or more, it can be shaped not only with the resolution of high-performance 3D printers but also with that of general-purpose 3D printers. Here, the "minimum width W0 of each continuous bone part 2BA" refers to the width W0 of a portion of the continuous bone part 2BA in which the width W0 is minimum in the direction of extension.

Similarly, in the examples described herein, the minimum value of the width W1 (FIG. 4A) of each first split bone part 51 is preferably 0.05 mm or more, and more preferably 0.10 mm or more. In the examples described herein, the minimum value of each second split bone part 52 (FIG. 4A) is preferably 0.05 mm or more, and more preferably 0.10 mm or more. Here, the "minimum value of the width W1 of each first split bone part 51" refers to the width W1 of a portion of the first split bone part 51 in which the width W1 is minimum in the direction of extension. The "minimum width W2 of each second split bone part 52" refers to the width W2 of a portion of the second split bone part 52 in which the width W2 is minimum in the direction of extension.

On the other hand, in the examples described herein, from the viewpoint of improving the accuracy of the outer edge (outer contour) shape of the skeleton part 2, reducing the gap (interval) between the cell holes C, and improving the characteristics as a cushion member, the maximum value of the width W0 of each continuous bone part 2BA is preferably 2.0 mm or less. Here, the "maximum value of the width W0 of each continuous bone part 2BA" refers to the width W0 of a portion of the continuous bone part 2BA in which the width W0 is maximum in the direction of extension.

Similarly, in the examples described herein, the maximum value of the width W1 of each first split bone part 51 is preferably 2.0 mm or less. Furthermore, in the examples described herein, the maximum value of the width W2 of each second split bone part 52 is preferably 2.0 mm or less. The "maximum value of the width W1 of each first split bone part 51" refers to the width W1 of a portion of the first split bone part 51 in which the width W1 is maximum in the direction of extension. The "maximum value of the width W2 of each second split bone part 52" refers to the width W2 of the second split bone part 52 in which the width W2 is maximum in the direction of extension.

Additionally, it is preferable for each continuous bone part 2BA included in the skeleton part 2 to satisfy the above configuration, but only some continuous bone parts 2BA in the continuous bone parts 2BA included in the skeleton part 2 may also satisfy the above configuration, and even in such cases, similar effects can be obtained, although the degree may vary. Furthermore, it is preferable for each first split bone part 51 included in the skeleton part 2 to satisfy the above configuration, but only some first split bone parts 51 in the first split bone parts 51 included in the skeleton part 2 may also satisfy the above configuration, and even in such cases, similar effects can be obtained, although the degree may vary. Moreover, it is preferable for each second split bone part 52 included the skeleton part 2 to satisfy the above configuration, but only some second split bone parts 52 in the second split bone parts 52 included in the skeleton part 2 may also satisfy the above configuration, and even in such cases, similar effects can be obtained, although the degree may vary.

In these examples, each continuous bone part 2BA included in the skeleton part 2 is columnar and has a circular (perfectly circular) cross-sectional shape (FIGS. 1 to 4A). In these examples, each first split bone part 51 included in the skeleton part 2 is columnar and has a circular (perfectly circular) cross-sectional shape (FIGS. 1, 3 and 4A). In these examples, each second split bone part 52 included in the skeleton part 2 is columnar and has a circular (perfectly circular) cross-sectional shape (FIGS. 1, 3 and 4A).

This simplifies the configuration of the skeleton part 2, thus making it easy to shape it using a 3D printer. It is also easier to reproduce mechanical characteristics in typical polyurethane foam produced through a process of foaming by chemical reaction. Thus, the characteristics of the porous structural body 1 as a cushion member can be improved. Furthermore, by making each continuous bone part 2BA, each first split bone part 51, and each second split bone part 52 columnar, the durability of the skeleton part 2 can be improved compared to a case in which the continuous bone part 2BA, the first split bone part 51 and the second split bone part 52 are replaced with thin film-like parts.

The cross-sectional shape of each continuous bone part 2BA is a shape of the continuous bone part 2BA in a cross-section perpendicular to the central axis (skeleton line O). The cross-sectional shape of each first split bone part 51 is a shape of the first split bone part 51 in a cross-section perpendicular to the central axis. The cross-sectional shape of each second split bone part 52 is a shape of the second split bone part 52 in a cross-section perpendicular to the central axis.

The present disclosure is not limited to these examples, and only some continuous bone parts 2BA in the continuous bone parts 2BA included in the skeleton part 2 may also satisfy the above configuration, and even in such cases, similar effects can be obtained, although the degree may vary. Furthermore, only some first split bone parts 51 in the first split bone parts 51 included in the skeleton part 2 may also satisfy the above configuration, and even in such cases, similar effects can be obtained, although the degree may vary. Moreover, only some second split bone parts 52 in the second split bone parts 52 included in the skeleton part 2 may also satisfy the above configuration, and even in such cases, similar effects can be obtained, although the degree may vary.

For example, in the examples described herein, all or some continuous bone parts 2BA in the continuous bone parts 2BA included in the skeleton part 2 may each have a polygonal (e.g. equilateral triangular, triangular but not equilateral, or quadrilateral) cross-sectional shape, or a circular (e.g. oval) cross-sectional shape that is not perfectly circular, and even in such cases, effects similar to these examples can be obtained. Furthermore, in the examples described herein, all or some first split bone parts 51 in the first split bone parts 51 included in the skeleton part 2 may each have a polygonal (e.g. equilateral triangular, triangular but not equilateral, or quadrilateral) cross-sectional shape, or a circular (e.g. oval) cross-sectional shape that is not perfectly circular, and even in such cases, effects similar to these examples can be obtained. Moreover, in the examples described herein, all or some second split bone parts 52 in the second split bone parts 52 included in the skeleton part 2 may each have a polygonal (e.g. equilateral triangular, triangular but not equilateral, or quadrilateral) cross-sectional shape, or a circular (e.g. oval) cross-sectional shape that is not perfectly circular, and even in such cases, effects similar to these examples can be obtained.

In the examples described herein, each continuous bone part 2BA may have a uniform or a non-uniform cross-sectional shape along its direction of extension. Furthermore, in the examples described herein, each first split bone part 51 may have a uniform or a non-uniform cross-sectional shape along its direction of extension. Moreover, in the examples described herein, each second split bone part 52 may have a uniform or a non-uniform cross-sectional shape along its direction of extension.

In the examples described herein, the respective continuous bone parts 2BA may have different cross-sectional shapes. Furthermore, in the examples described herein, the respective first split bone parts 51 may have different cross-sectional shapes. Moreover, in the examples described herein, the respective second split bone parts 52 may have different cross-sectional shapes.

In the examples described herein, the ratio of the volume VB occupied by the skeleton part 2 to the apparent volume VS of the skeleton part 2 (VB×100/VS [%]) is preferably 3 to 10%. This configuration enables the skeleton part 2 to generate favorable reaction force when weight is applied to it, and thus the skeleton part 2 provides favorable hardness (and thus the porous structural body 1 provides favorable hardness) as a cushion member, for example as a seat pad (in particular, as a car seat pad).

The "apparent volume VS of the skeleton part 2" refers to the volume of the entire internal space (the sum of the volume occupied by the skeleton part 2, in a case in which later-described films 3 [FIG. 16] are provided, the volume occupied by the films 3, and the volume occupied by the void space) surrounded by the outer edge (outer contour) of the skeleton part 2.

When it is assumed that the same material is used to make the skeleton part 2, the higher the ratio of the volume VB occupied by the skeleton part 2 to the apparent volume VS of the skeleton part 2, the harder the skeleton part 2 (and thus the porous structural body 1). The lower the ratio of the volume VB occupied by the skeleton part 2 to the apparent volume VS of the skeleton part 2, the softer the skeleton part 2 (and thus the porous structural body 1).

From the viewpoint of enabling the skeleton part 2 to generate favorable reaction force when weight is applied to it, and thus enabling the skeleton part 2 (and thus the porous structural body 1) to provide favorable hardness as a cushion member, for example as a seat pad (in particular, as a car seat pad), the ratio of the volume VB occupied by the skeleton part 2 to the apparent volume VS of the skeleton part 2 is more preferably 4 to 8%.

Any method may be used to adjust the ratio of the volume VB occupied by the skeleton part 2 to the apparent volume VS of the skeleton part 2. Examples of such methods include a method of adjusting the thickness (cross-sectional area) of some or all bone parts 2B included in the skeleton part 2 and/or the size (cross-sectional area) of some or all connection parts J included in the skeleton part 2.

In the examples described herein, the 25% hardness of the porous structural body 1 is preferably 60 to 500 N, and more preferably 100 to 450 N. Here, the 25% hardness (N) of the porous structural body 1 is a measurement value obtained by measuring the weight (N) required to compress the porous structural body by 25% in an environment with a temperature of 23° C. and a relative humidity of 50% using an Instron compression testing machine. This allows the porous structural body 1 to provide favorable hardness as a cushion member, for example as a seat pad (in particular, as a car seat pad).

As illustrated in FIGS. 1 to 4B, in these examples, the skeleton part 2 includes a plurality (corresponding to the number of cell holes C) of cell defining parts 21 that define the cell holes C inside. The skeleton part 2 has a configuration in which the large number of cell defining parts 21 are interconnected. Each cell defining part 21 includes a plurality of bone parts 2B and a plurality of connection parts 2J. In the example of FIG. 1, the plurality of cell defining parts 21 included in the skeleton part 2 include one or a plurality of (in the example of FIG. 1, a plurality of) cell defining parts 21A without non-continuous bone parts 2BB and one or a plurality of (in the example of FIG. 1, a plurality of) cell defining parts 21B with one or a plurality of (in the example of FIG. 1, a plurality of) non-continuous bone parts 2BB. In the present embodiment, however, each cell defining part 21 included in the skeleton part 2 may be a cell defining part 21B with one or a plurality of non-continuous bone parts 2BB. It is preferable for each cell defining part 21B with one or a plurality of non-continuous bone parts 2BB to further include one or a plurality of continuous bone parts 2BA, as in the example of FIG. 3.

Figure 2:
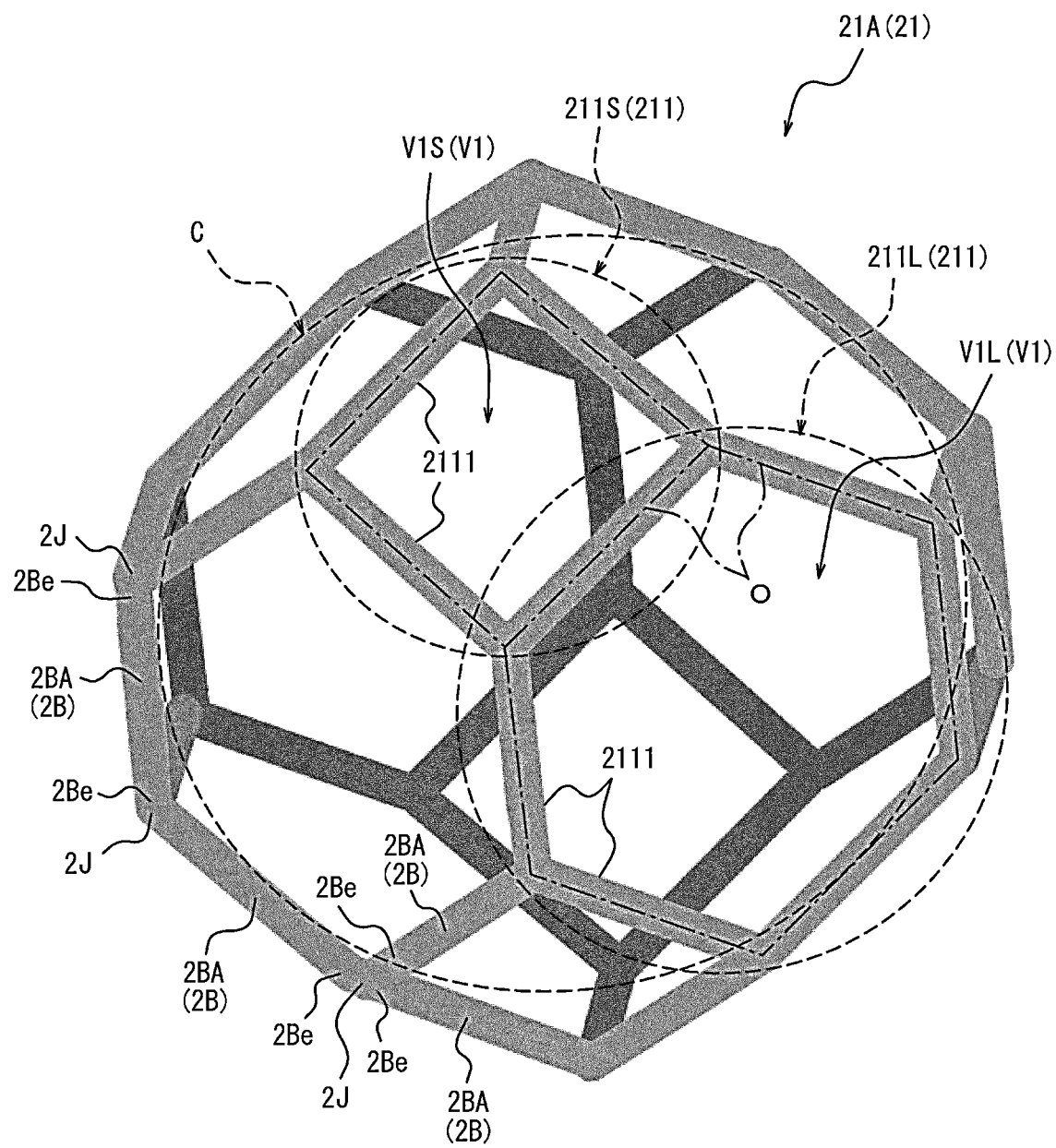
FIG. 2 is a perspective view illustrating a cell defining part without non-continuous bone parts in the porous structural body of FIG. 1.

FIG. 2 illustrates a cell defining part 21A without non-continuous bone parts 2BB in the plurality of cell defining parts 21 included in the porous structural body 1 of FIG. 1. In the cell defining part 21A, each bone part 2B is a continuous bone part 2BA. FIG. 3 illustrates a cell defining part 21B with one or a plurality of (in the example of FIG. 3, a plurality of) non-continuous bone parts 2BB in the plurality of cell defining parts 21 included in the porous structural body 1 of FIG. 1.

As illustrated in FIGS. 3 and 4A, each cell defining part 21 has a plurality of (in these examples, 14) annular parts 211. Each annular part 211 is configured in an annular shape (which encompasses a substantially annular shape), and a substantially flat virtual surface V1 is defined by an annular (which encompasses being substantially annular) inner peripheral edge portion 211 of the annular part 211. The virtual surface V1 is a virtual flat plane (i.e. a virtual closed plane) defined by the inner peripheral edge portion 2111 of the annular part 211. In each cell defining part 21, the plurality of annular parts 211 included in the cell defining part 21 are coupled to each other so that the virtual surfaces V1 defined by the respective inner peripheral edge portions 2111 do not intersect with each other.

A cell hole C is defined by a plurality of annular parts 211 included in the cell defining part 21 and a plurality of virtual surfaces V1 respectively defined by the plurality of annular parts 211. Generally speaking, the annular parts 211 are parts that define the sides of the solid shape formed by the cell hole C, and the virtual surfaces V1 are parts that define the constituent surfaces of the solid shape formed by the cell hole C.

Each annular part 211 includes a plurality of bone parts 2B and a plurality of connection parts 2J that connect the end portions 2Be of these plurality of bone parts 2B.

A coupling portion between a pair of annular parts 211 coupled to each other includes one bone part 2B and a pair of connection parts 2J on both sides of the bone part 2B, which are shared by the pair of annular parts 211. That is, each bone part 2B is shared by a plurality of annular parts 211 adjacent to the bone part 2B, and each connection part 2J is also shared by a plurality of annular parts 211 adjacent to the connection part 2J.

Each virtual surface V1 defines part of one cell hole C on its one side (the front side of the virtual surface V1) and also defines part of another cell hole C on its other side (the back side of the virtual surface V1). In other words, the front and back sides of each virtual surface V1 define parts of different cell holes C. To put it yet another way, each virtual surface V1 is shared by a pair of cell holes C adjacent to the virtual surface V1 (i.e. a pair of cell holes C between which the virtual surface V1 is sandwiched).

Each annular part 211 is also shared by a pair of cell defining parts 21 adjacent to the annular part 211 (i.e. a pair of cell defining parts 21 between which the annular part 211 is sandwiched) (FIGS. 1 and 4A). In other words, each annular part 211 forms parts of a pair of cell defining parts 21 adjacent to the annular part 211.

In the examples of FIGS. 1 to 4B, each virtual surface V1 in the porous structural body 1 is exposed without being covered with a film 3 (FIG. 16), i.e. forms an opening. The cell holes C therefore communicate with each other through the virtual surface V1, thus allowing air to pass through between the cell holes C. This improves the breathability of the skeleton part 2 and also allows the skeleton part 2 to undergo compressive deformation and restoration easily in response to the addition and release of weight.

As illustrated in FIGS. 1 to 4B, in these examples, the skeleton line O of each cell defining part 21 has a substantially polyhedral shape, whereby each cell hole C has a substantially polyhedral shape. More specifically, in the examples of FIGS. 1 to 4B, the skeleton line O of each cell defining part 21 has a substantially Kelvin's tetradecahedral (truncated octahedral) shape, whereby each cell hole C has a substantially Kelvin's tetradecahedral (truncated octahedral) shape. A Kelvin's tetradecahedron (truncated octahedron) is a polyhedron with six regular square constituent surfaces and eight regular hexagonal constituent surfaces. The cell holes C included in the skeleton part 2 are, generally speaking, arranged in a regular manner, so as to spatially fill the inner space surrounded by the outer edge (outer contour) of the skeleton part 2 (i.e. so that each cell hole C is laid out with no unnecessary gaps, or in other words, so that the gap (interval) between the cell holes C is reduced).

As illustrated in FIGS. 1 to 4B, in these examples, the plurality of (in these examples, 14) annular parts 211 included in the cell defining part 21 include one or a plurality of (in these examples, six) small annular parts 211S and one or a plurality of (in these examples, eight) large annular parts 211L. The annular (which encompasses being substantially annular) inner peripheral edge portion 2111 of each small annular part 211S defines a substantially flat small virtual surface V1S. The annular (which encompasses being substantially annular) inner peripheral edge portion 2111 of each large annular part 211L defines a large virtual surface V1L, which is substantially flat and which has a larger area than the small virtual surface V1S. The small virtual surface V1S and the large virtual surface V1L are virtual planes (i.e. virtual closed planes).

As can be seen from FIGS. 2 and 3, in these examples, the skeleton line O of each large annular part 211L has a substantially regular hexagonal shape, and accordingly, the corresponding large virtual surface V1L has a substantially regular hexagonal shape. In these examples, the skeleton line O of each small annular part 211S has a substantially regular square shape, and accordingly, the corresponding small virtual surface V1S has a substantially regular square shape. Thus, in these examples, the small virtual surface V1S and the large virtual surface V1L differ not only in area but also in form (specifically, in the number and shape of the constituent surfaces).

Each large annular part 211L includes a plurality of (in these examples, six) bone parts 2B and a plurality of (in these examples, six) connection parts 2J that connect the end portions 2Be of the plurality of bone parts 2B. Each small annular part 211S includes a plurality of (in these examples, four) bone parts 2B and a plurality of (in these examples, four) connection parts 2J that connect the end portions 2Be of the plurality of bone parts 2B.

In the examples of FIGS. 1 to 4B, the skeleton lines O of the plurality of cell defining parts 21 included in the skeleton part 2 each have a substantially Kelvin's tetradecahedral (truncated octahedral) shape. As described above, a Kelvin's tetradecahedron (truncated octahedron) is a polyhedron with six square constituent surfaces and eight regular hexagonal constituent surfaces. Accordingly, the cell hole C defined by each cell defining part 21 also have a substantially Kelvin's tetradecahedral shape. The skeleton lines O of the plurality of cell defining parts 21 included in the skeleton part 2 are connected to each other in a space-filling manner, so as to form a mesh pattern. That is, there is no gap between the skeleton lines O of the plurality of cell defining parts 21.

Thus, in these examples, the skeleton lines O of the plurality of cell defining parts 21 included in the skeleton part 2 each have a substantially polyhedral shape (in these examples, a substantially Kelvin's tetradecahedral shape), and accordingly, the cell holes C each have a substantially polyhedral shape (in these examples, a substantially Kelvin's tetradecahedral shape), so that the gap (interval) between the cell holes C included in the porous structural body 1 can be further reduced, and a larger number of cell holes C can be formed inside the porous structural body 1. This also improves the behavior of the porous structural body 1 undergoing compressive deformation and restoration in response to the addition and release of weight as a cushion member, for example as a seat pad (in particular, a car seat pad). Additionally, the gap (interval) between the cell holes C corresponds to material parts (bone parts 2B and connection parts 2J) of the skeleton part 2 that define the cell holes C.

In these examples, the skeleton lines O of the plurality of cell defining parts 21 included in the skeleton part 2 are connected to each other in a space-filling manner, so that the gap (interval) between the cell holes C included the porous structural body 1 can be further reduced. Thus, the characteristics of the porous structural body as a cushion member can be improved.

The substantially polyhedral shape formed by the skeleton line O of each cell defining part 21 (and thus the substantially polyhedral shape formed by each cell hole C) is not limited to the examples in the figures, but can be any.

For example, substantially polyhedral shapes formed by the skeleton lines O (and thus the substantially polyhedral shape formed by the cell holes C) of the plurality of cell defining parts 21 included in the skeleton part 2 are preferably space-filling shapes (that can be arranged without any gaps). This allows the skeleton lines O of the plurality of cell defining parts 21 included in the skeleton part 2 to be connected to each other in a space-filling manner, thereby improving the characteristics of the porous structural body as a cushion member. In this case, the substantially polyhedral shapes formed by the skeleton lines O of the plurality of cell defining parts 21 (and thus the substantially polyhedral shapes formed by the cell holes C) included in the skeleton part 2 may include only one type of substantially polyhedral shape, as in these examples, or may include several types of substantially polyhedral shapes. Here, regarding polyhedral shapes, "type" refers to the form (the number and shape of constituent surfaces), and specifically means that two polyhedral shapes with different forms (different numbers and shapes of constituent surfaces) are treated as two types of polyhedral shapes, while two polyhedral shapes with the same form but different dimensions are treated as the same type of polyhedral shape. Examples of substantially polyhedral shapes formed by the skeleton lines O of the plurality of cell defining parts 21 included in the skeleton part 2 in a case in which they are space-filling and they include only one type of substantially polyhedral shape include, in addition to substantially Kelvin's tetradecahedral shapes, substantially regular triangular prisms, substantially hexagonal prisms, substantially cubic shapes, substantially rectangular parallelepipeds, and substantially rhombic dodecahedrons. As illustrated in the examples in the figures, in a case in which the skeleton line O of each cell defining part 21 has a substantially Kelvin's tetradecahedral (truncated octahedral) shape, it is easier to reproduce the characteristics of cushion members equivalent to typical polyurethane foam manufactured through a process of foaming by chemical reaction, compared to any other shape. Further, in a case in which the skeleton line O of each cell defining part 21 is a substantially Kelvin's tetradecahedral (truncated octahedral) shape, the same mechanical properties can be obtained in all directions. Examples of substantially polyhedral shapes formed by the skeleton lines O of the plurality of cell defining parts 21 included in the skeleton part 2 in a case in which they are space-filling and they include several types of substantially polyhedral shapes include a combination of substantially regular tetrahedral shapes and substantially regular octahedral shapes, a combination of substantially regular tetrahedral shapes and substantially truncated tetrahedral shapes, and a combination of substantially regular octahedral shapes and substantially truncated hexahedral shapes. These are examples of combinations of two types of substantially polyhedral shapes, but combinations of three or more types of substantially polyhedral shapes are also possible.

The substantially polyhedral shapes formed by the skeleton lines O of the plurality of cell defining parts 21 (and thus the substantially polyhedral shapes formed by the cell holes C) included in the skeleton part 2 can be, for example, any substantially regular polyhedral shapes (substantially convex polyhedral shapes in which all the faces are congruent and the number of faces touching each vertex is equal), substantially semi-regular polyhedral shapes (substantially convex polyhedral shapes in which all the faces are substantially regular polygons and all the vertices have congruent shapes [i.e. the type and order of substantially regular polygons at each vertex are the same], except for substantially regular polyhedral shapes), substantially prism shapes, or substantially polygonal pyramids.

The skeleton lines O of some or all cell defining parts 21 in the plurality of cell defining parts 21 included in the skeleton part 2 may also have a substantially solid shape (e.g. substantially spherical, substantially ellipsoidal, or substantially cylinder) other than a substantially polyhedral shape. Accordingly, some or all cell holes C in the plurality of cell holes C included in the skeleton part 2 may have a substantially solid shape (e.g. substantially spherical, substantially ellipsoidal, or substantially cylinder) other than a substantially polyhedral shape.

Because the plurality of annular parts 211 included in the cell defining parts 21 include the small annular parts 211S and the large annular parts 211L of different sizes, the gap (interval) between the cell holes C included in the skeleton part 2 can be further reduced. Furthermore, in a case in which the shape (the number of sides) of the small annular parts 211S and that of the large annular parts 211L are different, as in these examples, the gap (interval) between the cell holes C included in the skeleton part 2 can be even further reduced.

The plurality of annular parts 211 included in the cell defining parts 21 may, however, each have the same size and/or shape (the same number of sides) as each other. In a case in which the size and shape (the number of sides) of each annular part 211 included in the cell defining parts 21 are the same, the same mechanical properties can be obtained in all directions.

As in these examples, because the skeleton lines O of some or all (in these examples, all) annular parts 211 in the annular parts 211 included in the cell defining parts 21 (and thus some or all [in these examples, all] virtual surfaces V1 in the virtual surfaces V1 included in the cell defining parts 21) have a substantially polygonal shape, the interval between the cell holes C included in the skeleton part 2 can be further reduced. This also improves the behavior of the skeleton part 2 undergoing compressive deformation and restoration in response to the addition and release of weight as a seat pad, in particular as a car seat pad. Moreover, the shape of the annular parts 211 (and thus the shape of the virtual surfaces V1) is simplified, which improves manufacturability and ease of adjusting the characteristics. Additionally, in a case in which at least one annular part 211 in the annular parts 211 included in the skeleton part 2 (and thus at least one virtual surface V1 in the virtual surfaces V1 included in the skeleton part 2) satisfies the above configuration, similar effects can be obtained, although the degree may vary.

Additionally, the skeleton line O of at least one annular part 211 in the annular parts 211 included in the skeleton part 2 (and thus at least one virtual surface V1 in the virtual surfaces V1 included in the skeleton part 2) may have any substantially polygonal shape other than a substantially regular hexagonal shape or a substantially regular square shape as in these examples, or have a substantially planar shape (e.g. substantially circular [such as substantially perfectly circular or substantially elliptical]) other than a substantially polygonal shape. In a case in which the skeleton lines O of the annular parts 211 (and thus the virtual surfaces V1) have a substantially circular shape (e.g. substantially perfectly circular or substantially elliptical), the shapes of the annular parts 211 (and thus the shapes of the virtual surfaces V1) are simplified, which improves manufacturability and ease of adjusting the characteristics, and more homogeneous mechanical characteristics can be obtained. For example, in a case in which the skeleton lines O of the annular parts 211 (and thus the virtual surfaces V1) have an elliptical shape (horizontally long elliptical shape) that is long in a direction substantially perpendicular to the predetermined weight input direction ID, the annular parts 211, and thus the skeleton part 2 (and thus, the porous structural body 1) is more easily deformed (softer) in response to weight input, compared to a case in which it has an elliptical shape (vertically long elliptical shape) that is long in a direction substantially parallel to the predetermined weight input direction ID.

In these examples, it is preferable for the skeleton part 2 to have at least one cell hole C with a diameter of 5 mm or more. This makes it easier to realize manufacturing of the porous structural body 1 using a 3D printer. When the diameter of each cell hole C of the skeleton part 2 is less than 5 mm, the configuration of the skeleton part 2 becomes too complex and as a result, it may become difficult to generate 3D shape data (such as CAD data) representing the 3D shape of the porous structural body 1 or 3D shaping data generated based on such 3D shape data on a computer.

Since porous structural bodies included in conventional cushion members are manufactured through a process of foaming by chemical reaction, it has not been easy to form cell holes C with a diameter of 5 mm or more.

The breathability and ease of deformation of the skeleton part 2 can be easily improved when the skeleton part 2 has cell holes C with a diameter of 5 mm or more.

From the above viewpoint, it is preferable for all the cell holes C included in the skeleton part 2 to have a dimeter of 5 mm or more.

The larger the diameter of the cell holes C, the easier it becomes to realize manufacturing of the porous structural body 1 using a 3D printer, and the easier it becomes to improve breathability and deformability. From this viewpoint, the diameter of at least one (preferably all) of the cell holes C in the skeleton part 2 is preferably 8 mm or more, and more preferably 10 mm or more.

On the other hand, when the cell holes C of the skeleton part 2 are too large, it becomes difficult to form the outer edge (outer contour) shape of the skeleton part 2 (and thus the porous structural body 1) well (smoothly), and the shape accuracy of the cushion member (e.g. a seat pad, in particular, a car seat pad) may decrease and the appearance may deteriorate. Furthermore, the characteristics of the cushion member (e.g. a seat pad, in particular, a car seat pad) may not be sufficiently favorable. Accordingly, from the viewpoint of improving appearance and characteristics as a cushion material (e.g. a seat pad, in particular, a car seat pad), the diameter of each cell hole C of the skeleton part 2 is preferably less than 30 mm, more preferably 25 mm or less, and even more preferably 20 mm or less.

The more cell pores C of the porous structural body 1 that satisfy the aforementioned numerical ranges of diameters, the easier it is to obtain the aforementioned effects. From this viewpoint, it is preferable that the diameter of each cell hole C included in the porous structural body 1 satisfy at least one of the aforementioned numerical ranges. Similarly, it is more preferable that the average value of the diameter of each cell hole C included in the porous structural body 1 satisfy at least one of the aforementioned numerical ranges.

Additionally, the diameter of each cell hole C refers to the diameter of the circumscribed sphere of the cell hole C when the cell hole C has a shape different from a strictly spherical shape, as in these examples.

When the cell holes C of the skeleton part 2 are too small, the configuration of the skeleton part 2 may become too complex, and as a result, it may become difficult to generate 3D shape data (such as CAD data) representing the 3D shape of the porous structural body 1, or 3D shaping data generated based on such 3D shape data on a computer. From the viewpoint of making it easy to manufacture the porous structural body 1 using a 3D printer, the diameter of a cell hole C having the smallest diameter among the cell holes C included in the skeleton part 2 is preferably 0.05 mm or more, and more preferably 0.10 mm or more. When the diameter of the cell hole C having the smallest diameter is 0.05 mm or more, it can be shaped with the resolution of high-performance 3D printers, and when it is 0.10 mm or more, it can be shaped not only with the resolution of high-performance 3D printers but also with that of general-purpose 3D printers.

As illustrated in FIGS. 4A to 5B, the porous structural body 1 is configured such that when it is compressed to deform in the predetermined weight input direction ID, a plurality of portions of the skeleton part 2 interfere with each other. Accordingly, the porous structural body 1 is configured such that friction is generated between the plurality of portions of the skeleton part 2 when the porous structural body 1 is compressed to deform in the predetermined weight input direction ID. FIG. 4A illustrates the porous structural body 1 in its natural state in which compressive deformation has not occurred, while FIG. 5A illustrates the porous structural body 1 in a state in which compressive deformation has occurred in the predetermined weight input direction ID.

Herein, the "predetermined weight input direction ID" is a predetermined direction in which main weight from a user or the like is input to the porous structural body 1. For example, when the porous structural body 1 is configured as a cushion member (e.g. a seat pad as in the example of FIG. 17), the predetermined weight input direction ID is preferably a thickness direction TD of the cushion member.

Herein, "when compressed to deform" specifically refers to a period of time during which compressive deformation occurs in a state in which any cell C of the porous structural body 1 is not completely collapsed.

Herein, "interfering" between the plurality of portions specifically refers to rubbing (being in contact while moving) between the plurality of portions that are previously in contact or out of contact with each other, colliding between the plurality of portions that are previously out of contact with each other (immediately after colliding, they may remain in contact without moving, or they may remain in contact while moving), or the like.

Figure 4B:
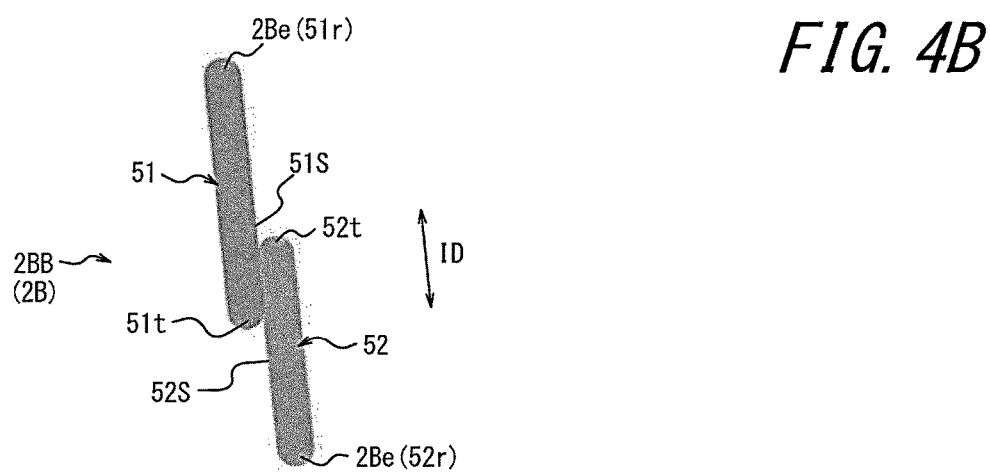
FIG. 4B illustrates a non-continuous bone part in the porous structural body in the state of FIG. 4A.

More specifically, the porous structural body 1 according to the present embodiment is configured such that the first and second split bone parts 51, 52 in at least one (preferably all) of the non-continuous bone parts 2BB rub against each other when the porous structural body 1 is compressed to deform in the predetermined weight input direction ID (FIGS. 4B and 5B). Accordingly, the porous structural body 1 is configured such that friction is generated between the first and second split bone parts 51, 52 in the at least one (preferably all) of the non-continuous bone parts 2BB when the porous structural body 1 is compressed to deform in the predetermined weight input direction ID. When the porous structural body 1 is in the natural state, the first and second split bone parts 51, 52 in each non-continuous bone part 2BB may be in contact or out of contact with each other. From the viewpoint of preventing adhesion between the first and second split bone parts 51, 52 in each non-continuous bone part 2BB during shaping using a 3D printer, the first and the second split bone parts 51, 52 in each non-continuous bone part 2BB are preferably out of contact with each other when the porous structural body 1 is in the natural state.

More specifically, in the present embodiment, as illustrated in FIG. 3, in at least one (preferably all) of the non-continuous bone parts 2BB, the first split bone part 51 has a first side 51S and the second split bone part 52 has a second side 52S. The porous structural body 1 is configured such that the first side 51S of the first split bone part 51 and the second side 52S of the second split bone part 52 in the at least one (preferably all) of the non-continuous bone parts 2BB rub against each other when the porous structural body 1 is compressed to deform in the predetermined weight input direction ID (FIGS. 4B and 5B). Accordingly, the porous structural body 1 is configured such that friction is generated between the first side 51S of the first split bone part 51 and the second side 52S of the second split bone part 52 in the at least one (preferably all) of the non-continuous bone parts 2BB when the porous structural body 1 is compressed to deform in the predetermined weight input direction ID. The "first side 51S" of each first split bone part 51 is a portion of the side of the first split bone part 51 (the surface of the first split bone part 51, except for the end surfaces on both sides in its direction of extension) that is configured to rub against the second split bone part 52 when the porous structural body 1 is compressed to deform in the predetermined weight input direction ID. The "second side 52S" of each second split bone part 52 is a portion of the side of the second split bone part 52 (the surface of the second split bone part 52, except for the end surfaces on both sides of its direction of extension) that is configured to rub against the first split bone part 51 when the porous structural body 1 is compressed to deform in the predetermined weight input direction ID.

As in the example of FIG. 3, the direction of extension of each non-continuous bone part 2BB is preferably parallel to each other. In the example of FIG. 3, each of the six bone parts 2B in the cell defining part 21B that are substantially parallel to each other is a non-continuous bone part 2BB, and when the porous structural body 1 is compressed to deform in the predetermined weight input direction ID, the first side 51S of the first split bone part 51 and the second side 52S of the second split bone part 52 in each non-continuous bone part 2BB are configured to rub against each other. It is, however, possible to configure some (one or more) of the six bone parts 2B that are substantially parallel to each other in the cell defining part 21B as non-continuous bone parts 2BB, and when the porous structural body 1 is compressed to deform in the predetermined weight input direction ID, the first side 51S of the first split bone part 51 and the second side 52S of the second split bone part 52 in at least one (preferably all) of the non-continuous bone parts 2BB may be configured to rub against each other. Additionally, as in the example of FIG. 3, the predetermined weight input direction ID is preferably substantially parallel to the direction of extension of each non-continuous bone part 2BB.

According to the present embodiment, as described above, the porous structural body 1 is configured such that a plurality of portions of the skeleton part 2 interfere with each other when the porous structural body 1 is compressed to deform in the predetermined weight input direction ID. Accordingly, the porous structural body 1 is configured such that friction is generated between the plurality of portions of the skeleton part 2 when the porous structural body 1 is compressed to deform in the predetermined weight input direction ID. More specifically, the porous structural body 1 according to the present embodiment is configured such that the first and second split bone parts 51, 52 in at least one (preferably all) of the non-continuous bone parts 2BB rub against each other when the porous structural body 1 is compressed to deform in the predetermined weight input direction ID. Accordingly, the porous structural body 1 is configured such that friction is generated between the first and second split bone parts 51, 52 in the at least one (preferably all) of the non-continuous bone parts 2BB when the porous structural body 1 is compressed to deform in the predetermined weight input direction ID. More specifically, in the present embodiment, the porous structural body 1 is configured such that the first side 51S of the first split bone part 51 and the second side 52S of the second split bone part 52 in the at least one (preferably all) of the non-continuous bone parts 2BB rub against each other when the porous structural body 1 is compressed to deform in the predetermined weight input direction ID. Accordingly, the porous structural body 1 is configured such that friction is generated between the first side 51S of the first split bone part 51 and the second side 52S of the second split bone part 52 in the at least one (preferably all) of the non-continuous bone parts 2BB when the porous structural body 1 is compressed to deform in the predetermined weight input direction ID.

The generation of such friction can increase the viscosity of the porous structural body 1, which in turn makes it possible to differentiate the dynamic characteristics (specifically, the vibration damping properties [in particular, the hysteresis damping properties]) of the porous structural body according to the present embodiment from those of the aforementioned conventional porous structural bodies. Furthermore, by adjusting the number and area of the portions of the skeleton part 2 that interfere with each other, the amount of friction and the like can be adjusted, and in turn, the viscosity and thus the dynamic characteristics of the porous structural body 1 can be adjusted. Thus, it is possible to realize a greater variety of dynamic characteristics in accordance with requirements than in the past. Thus, according to the porous structural body 1 of the present embodiment, the degree of freedom to adjust the dynamic characteristics of the porous structural body 1 can be improved. This is particularly suitable when the porous structural body 1 is used for car seat pads to which vibrations are input during use.

The porous structural body 1 is not limited to the configuration of the first embodiment illustrated in FIGS. 1 to 5B, but can be configured so that a plurality of portions in the skeleton part 2 interfere with each other when the porous structural body 1 is compressed to deform in the predetermined weight input direction ID by adopting various configurations. Other embodiments of the porous structural body 1 will now be illustrated by way of example, focusing on points different from the first embodiment illustrated in FIGS. 1 to 5B. For points similar to the embodiment of FIGS. 1 to 5B, a description is basically omitted.

The following description of the configurations of the porous structural body 1 describes those of the porous structural body 1 in its natural state, unless otherwise stated.

The porous structural body 1 according to each embodiment described below is configured such that a plurality of portions of the skeleton part 2 interfere with each other when the porous structural body 1 is compressed to deform in a predetermined weight input direction ID, thus producing similar effects to those of the first embodiment described above.

Second Embodiment of Porous Structural Body

Figure 6A:
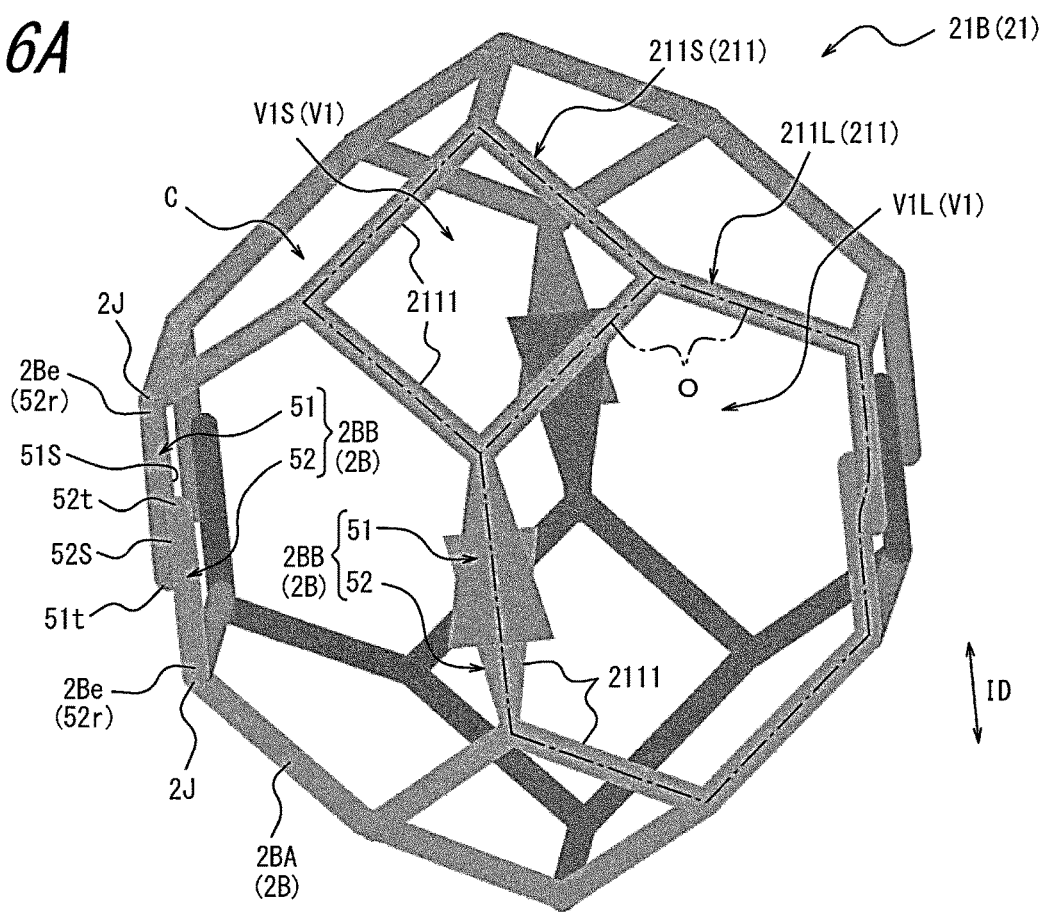
FIG. 6A is a perspective view illustrating a cell defining part with non-continuous bone parts in a porous structural body according to a second embodiment of the present disclosure.

FIGS. 6A to 7B illustrate the porous structural body 1 according to a second embodiment of the present disclosure. FIGS. 6A, 6B illustrate an example of the porous structural body 1 according to the second embodiment of the present disclosure, and FIGS. 7A, 7B respectively illustrate first and second modifications of the porous structural body 1 according to the second embodiment of the present disclosure.

In the second embodiment, as in the first embodiment, the porous structural body 1 is configured such that the first and second split bone parts 51, 52 in at least one (preferably all) of the non-continuous bone parts 2BB rub against each other when the porous structural body 1 is compressed to deform in a predetermined weight input direction ID. Accordingly, the porous structural body 1 is configured such that friction is generated between the first and second split bone parts 51, 52 in the at least one (preferably all) of the non-continuous bone parts 2BB when the porous structural body 1 is compressed to deform in the predetermined weight input direction ID.

More specifically, in the second embodiment, as in the first embodiment, in at least one (preferably all) of the non-continuous bone parts 2BB, the first split bone part 51 has a first side 51S, and the second split bone part 52 has a second side 52S. The porous structural body 1 is configured such that the first side 51S of the first split bone part 51 and the second side 52S of the second split bone part 52 in the at least one (preferably all) of the non-continuous bone parts 2BB rub against each other when the porous structural body 1 is compressed to deform in the predetermined weight input direction ID. Accordingly, the porous structural body 1 is configured such that friction is generated between the first side 51S of the first split bone part 51 and the second side 52S of the second split bone part 52 in the at least one (preferably all) of the non-continuous bone parts 2BB when the porous structural body 1 is compressed to deform in the predetermined weight input direction ID.

In the first embodiment (FIGS. 1 to 5B), as described above, the first and second split bone parts 51, 52 in at least one (in the examples in the figures, all) of the non-continuous bone parts 2BB are each configured in a columnar shape. In contrast, in the second embodiment (FIGS. 6A to 7B), the first split bone part 51 and/or the second split bone part 52 in at least one (preferably all) of the non-continuous bone parts 2BB are/is configured in a strip shape. More specifically, in the examples of FIGS. 6A to 7B, the first and second split bone parts 51, 52 in at least one (preferably all) of the non-continuous bone parts 2BB are each configured in a strip shape.

Figure 6B:
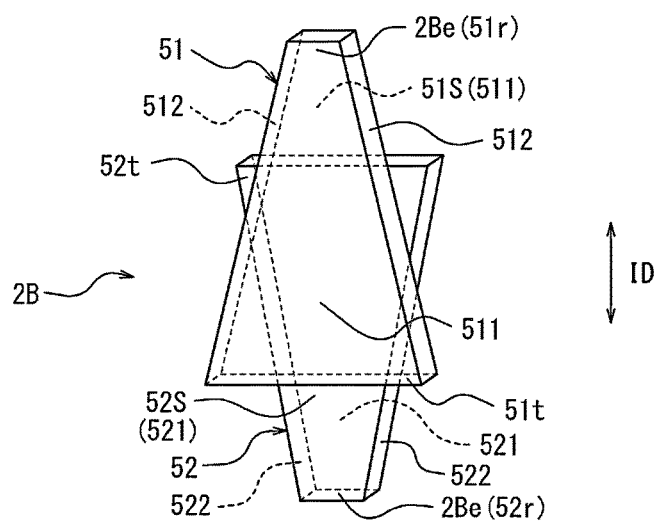
FIG. 6B illustrates a non-continuous bone part in the porous structural body of FIG. 6A.

As illustrated in an enlarged manner in FIG. 6B, in the at least one non-continuous bone part 2BB, the sides of the first split bone part 51 include a pair of wide sides 511 that are positioned opposite to each other, and a pair of narrow sides 512 that are positioned opposite to each other and that are narrower than the pair of wide sides 511. The first side 51S of the first split bone part 51 is one of the pair of wide sides 511 of the first split bone part 51. Similarly, in the at least one non-continuous bone part 2BB, the sides of the second split bone part 52 include a pair of wide sides 521 that are positioned opposite to each other, and a pair of narrow sides 522 that are positioned opposite to each other and that are narrower than the pair of wide sides 521. The second side 52S of the second split bone part 52 is one of the pair of wide sides 521 of the second split bone part 52.

In the second embodiment, however, only one of the first split bone part 51 and the second split bone part 52 in at least one (preferably all) of the non-continuous bone parts 2BB may be configured in a strip shape, although this is not illustrated. In that case, the other one of the first split bone part 51 and the second split bone part 52 in the non-continuous bone part 2BB is configured, for example, in a columnar shape.

According to the second embodiment, at least one of the first split bone part 51 and the second split bone part 52 in at least one (preferably all) of the non-continuous bone parts 2BB is configured in a strip shape, and thus configured to be wide. Accordingly, compared to the first embodiment, even in the event of misalignment or the like, the first and second sides 51S, 52S can more reliably rub against each other.

Furthermore, according to the examples of FIGS. 6A to 7B, the first and second split bone parts 51, 52 in at least one (preferably all) of the non-continuous bone parts 2BB are each configured in a strip shape. Accordingly, compared to the first embodiment, the contact area between the first and second sides 51S, 52S can be increased, and in turn, the amount of friction generated between the first and second sides 51S, 52S can be increased.

In the second embodiment, the first and second sides 51S, 52S in at least one (preferably all) of the non-continuous bone parts 2BB are each preferably not curved but substantially flat. In this case, the first and second sides 51S, 52S may be even surfaces (smooth surfaces), or they may be uneven due to having a plurality of protrusions P, as in the embodiment of FIGS. 8A and 8B, which will be described below.

The first and second sides 51S, 52S in at least one (preferably all) of the non-continuous bone parts 2BB may, however, each be curved in the same direction. In this case also, the first and second sides 51S, 52S may each be an even surface (smooth surface), or they may be uneven due to having a plurality of protrusions P, as in the embodiment of FIGS. 8A and 8B, which will be described below.

In the examples of FIGS. 6A and 6B, in the at least one (preferably all) of the non-continuous bone parts 2BB, the width of the first side 51S of the first split bone part 51 gradually increases from the root portion 51r of the first split bone part 51 towards the tip portion 51t of the first split bone part 51, and the width of the second side 52S of the second split bone part 52 gradually increases from the root portion 52r of the second split bone part 52 towards the tip portion 52t of the second split bone part 52.

The first and second sides 51S, 52S may, however, have any shapes.

For example, as in the first modification of FIG. 7A, in the at least one (preferably all) of the non-continuous bone parts 2BB, the width of the first side 51S of the first split bone part 51 may be constant from the root portion 51r of the first split bone part 51 towards the tip portion 51t of the first split bone part 51, and the width of the second side 52S of the second split bone part 52 may be constant from the root portion 52r of the second split bone part 52 towards the tip portion 52t of the second split bone part 52.

Alternatively, as in the second modification of FIG. 7B, in the at least one (preferably all) of the non-continuous bone parts 2BB, the width of the first side 51S of the first split bone part 51 may gradually increase from the root portion 51r of the first split bone part 51 towards the tip portion 51t of the first split bone part 51, and the width of the second side 52S of the second split bone part 52 may gradually decrease from the root portion 52r of the second split bone part 52 towards the tip portion 52t of the second split bone part 52.

Third Embodiment of Porous Structural Body

Figure 8A:
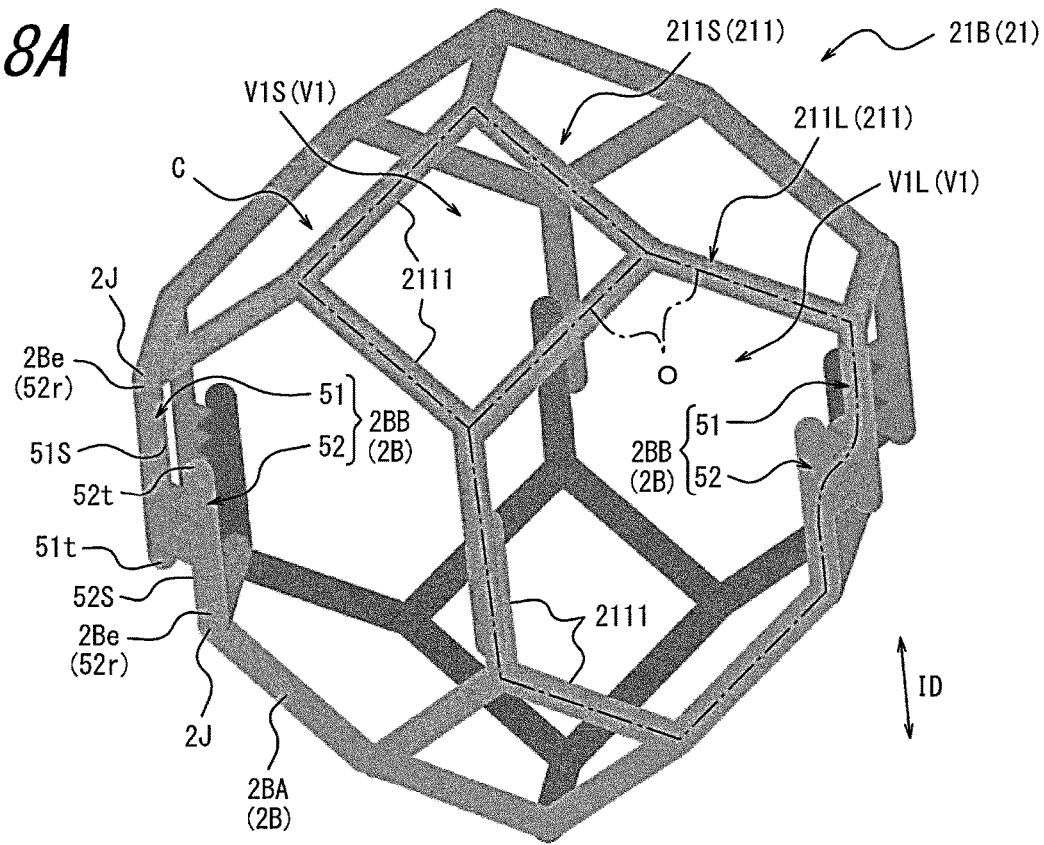
FIG. 8A is a perspective view illustrating a cell defining part with non-continuous bone parts in a porous structural body according to a third embodiment of the present disclosure.
Figure 8B:
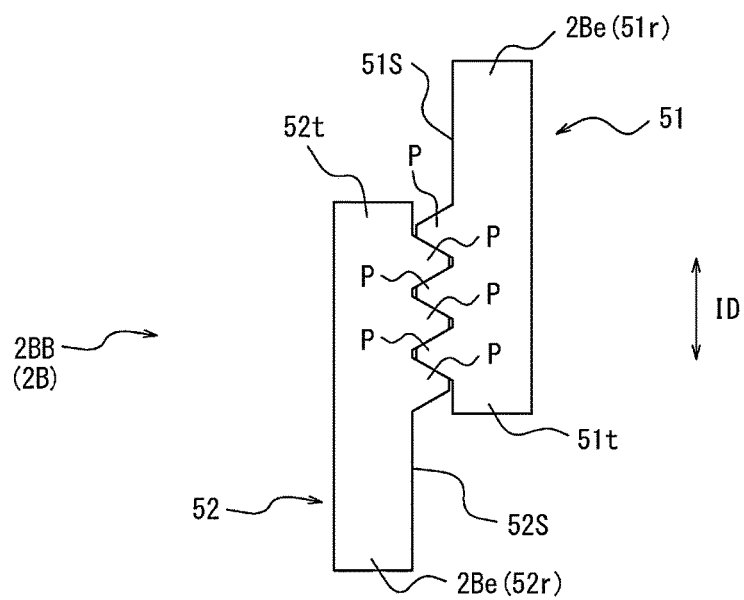
FIG. 8B illustrates a non-continuous bone part in the porous structural body of FIG. 8A.

FIGS. 8A and 8B illustrate the porous structural body 1 according to a third embodiment of the present disclosure.

In the third embodiment, as in the first embodiment, the porous structural body 1 is configured such that the first and second split bone parts 51, 52 in at least one (preferably all) of the non-continuous bone parts 2BB rub against each other when the porous structural body 1 is compressed to deform in a predetermined weight input direction ID. Accordingly, the porous structural body 1 is configured such that friction is generated between the first and second split bone parts 51, 52 in the at least one (preferably all) of the non-continuous bone parts 2BB when the porous structural body 1 is compressed to deform in the predetermined weight input direction ID.

More specifically, in the third embodiment, as in the first embodiment, in at least one (preferably all) of the non-continuous bone parts 2BB, the first split bone part 51 has a first side 51S and the second split bone part 52 has a second side 52S. The porous structural body 1 is configured such that the first side 51S of the first split bone part 51 and the second side 52S of the second split bone part 52 in the at least one (preferably all) of the non-continuous bone parts 2BB rub against each other when the porous structural body 1 is compressed to deform in the predetermined weight input direction ID. Accordingly, the porous structural body 1 is configured such that friction is generated between the first side 51S of the first split bone part 51 and the second side 52S of the second split bone part 52 in the at least one (preferably all) of the non-continuous bone parts 2BB when the porous structural body 1 is compressed to deform in the predetermined weight input direction ID.

In the first embodiment (FIGS. 1 to 5B), the first side 51S of the first split bone part 51 and the second side 52S of the second split bone part 52 in at least one (in the examples in the figures, all) of the non-continuous bone parts 2BB are each an even surface (smooth surface). In contrast, in the third embodiment (FIGS. 8A and 8B), the first side 51S of the first split bone part 51 and/or the second side 52S of the second split bone part 52 in at least one (preferably all) of the non-continuous bone parts 2BB have/has a plurality of protrusions P. Accordingly, the surface roughness of the first side 51S and/or the second side 52S is higher than other portions of the surface of the first split bone part 51 than the first side 51S and other portions of the surface of the second split bone part 52 than the second side 52S.

According to the third embodiment, the first side 51S of the first split bone part 51 and/or the second side 52S of the second split bone part 52 in at least one (preferably all) of the non-continuous bone parts 2BB have/has the plurality of protrusions P, whereby the surface roughness of the first side 51S and/or the second side 52S is higher than other portions of the surface of the first split bone part 51 than the first side 51S and other portions of the surface of the second split bone part 52 than the second side 52S, so that the amount of friction generated between the first and second sides 51S, 52S can be increased compared to the first embodiment.

The height of each protrusion P is preferably, for example, 2 mm or less, and more preferably 1 mm or less, from the viewpoint of making it easier for the first and second sides 51S, 52S to rub against each other. The height of each protrusion P is preferably, for example, 0.1 mm or more, and more preferably 0.3 mm or more, from the viewpoint of increasing the amount of friction generated between the first and second sides 51S, 52S. The "height of each protrusion P" refers to the height from the root of the protrusion P to the tip of the protrusion P.

Fourth Embodiment of Porous Structural Body

Figure 9A:
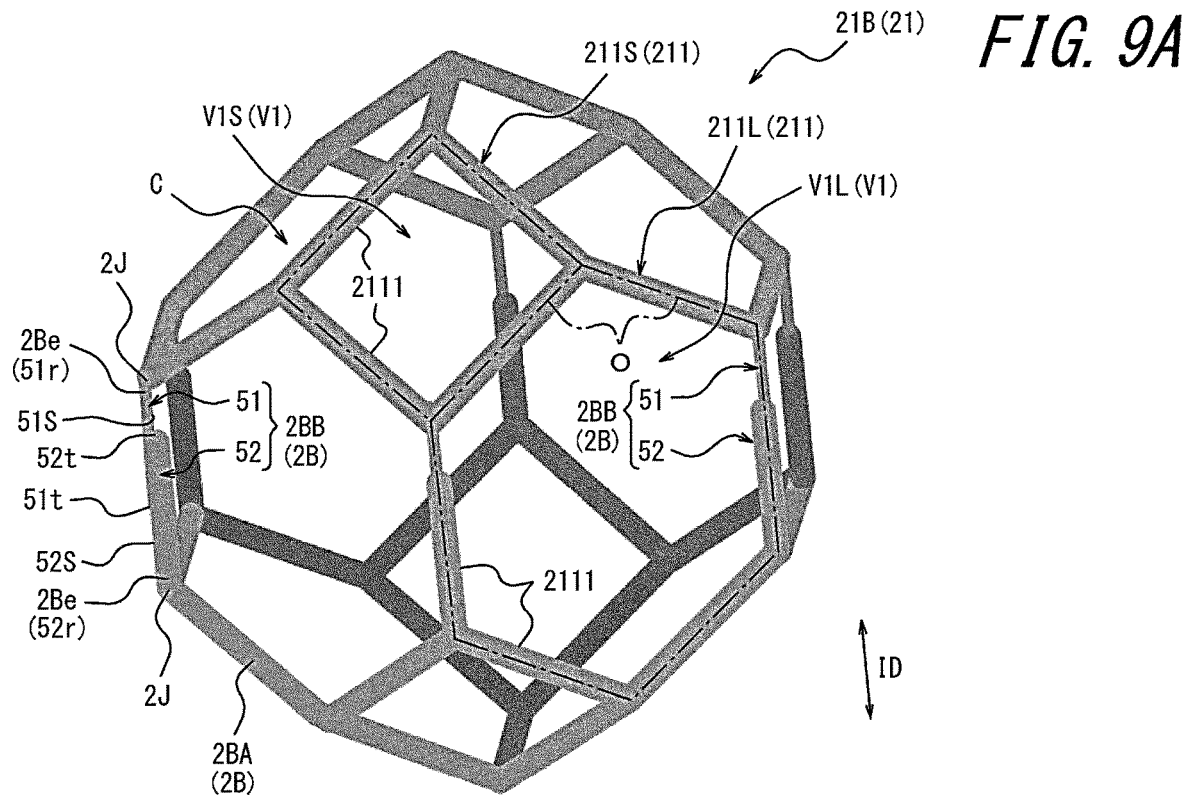
FIG. 9A is a perspective view illustrating a cell defining part with non-continuous bone parts in a porous structural body according to a fourth embodiment of the present disclosure.
Figure 9B:
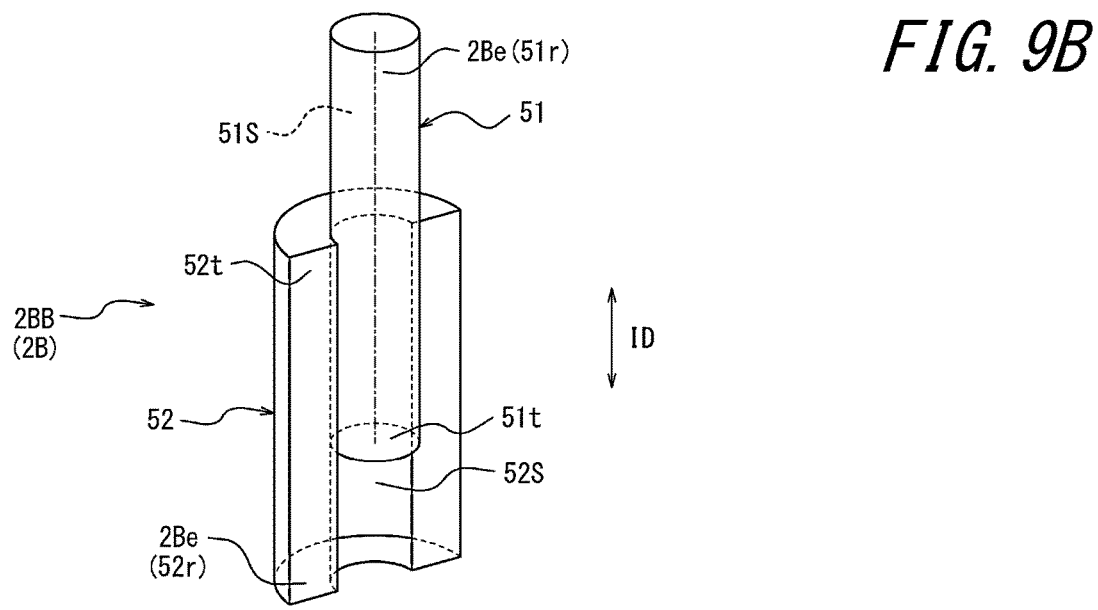
FIG. 9B illustrates a non-continuous bone part in the porous structural body of FIG. 9A.
Figure 10:
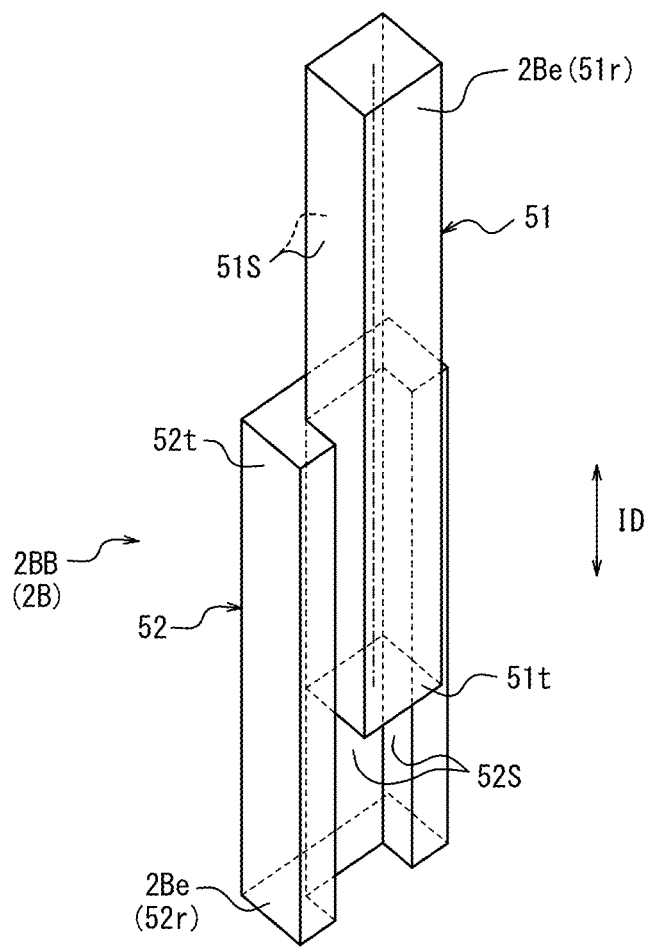
FIG. 10 illustrates a first modification of the non-continuous bone part in the porous structural body according to the fourth embodiment of the present disclosure.

FIGS. 9A to 10 illustrate the porous structural body 1 according to a fourth embodiment of the present disclosure. FIGS. 9A, 9B illustrate an example of the porous structural body 1 according to the fourth embodiment of the present disclosure, and FIG. 10 illustrates a first modification of the porous structural body 1 according to the fourth embodiment of the present disclosure.

In the fourth embodiment, as in the first embodiment, the porous structural body 1 is configured such that the first and second split bone parts 51, 52 in at least one (preferably all) of the non-continuous bone parts 2BB rub against each other when the porous structural body 1 is compressed to deform in a predetermined weight input direction ID. Accordingly, the porous structural body 1 is configured such that friction is generated between the first and second split bone parts 51, 52 in the at least one (preferably all) of the non-continuous bone parts 2BB when the porous structural body 1 is compressed to deform in the predetermined weight input direction ID.

More specifically, in the fourth embodiment, as in the first embodiment, in at least one (preferably all) of the non-continuous bone parts 2BB, the first split bone part 51 has a first side 51S and the second split bone part 52 has a second side 52S. The porous structural body 1 is configured such that the first side 51S of the first split bone part 51 and the second side 52S of the second split bone part 52 in the at least one (preferably all) of the non-continuous bone parts 2BB are configured to rub against each other when the porous structural body 1 is compressed to deform in the predetermined weight input direction ID. Accordingly, the porous structural body 1 is configured such that friction is generated between the first side 51S of the first split bone part 51 and the second side 52S of the second split bone part 52 in the at least one (preferably all) of the non-continuous bone parts 2BB when the porous structural body 1 is compressed to deform in the predetermined weight input direction ID.

In the first embodiment (FIGS. 1 to 5B), as described above, the first and second split bone parts 51, 52 in at least one (in the examples in the figures, all) of the non-continuous bone parts 2BB are each configured in a columnar shape. In contrast, in the fourth embodiment (FIGS. 9A to 10), in at least one (preferably all) of the non-continuous bone parts 2BB, the second side 52S of the second split bone part 52 is configured to surround the first side 51S of the first split bone part 51 along a circumferential direction of the first split bone part 51, at least when the porous structural body 1 is compressed to deform in the predetermined weight input direction ID. Accordingly, when the porous structural body 1 is compressed to deform in the predetermined weight input direction ID, the first side 51S slides on the second side 52S while being guided by the second side 52S. Here, the "circumferential direction of the first split bone part 51" is a direction of rotation around the central axis of the first split bone part 51 (indicated by a single dotted line in FIG. 9B and FIG. 10).

In the examples of FIGS. 9A to 10, the first split bone part 51 is configured in a columnar shape, whereby the first side 51S is a ridge surface. On the other hand, in the examples of FIGS. 9A to 10, the second side 52S of the second split bone part 52 is a groove surface that is hollow so as to surround the first split bone part 51 along the circumferential direction of the first split bone part 51 and that extends along the direction of extension of the second split bone part 52.

The second side 52S of the second split bone part 52 (and thus the second split bone part 52) may be configured in a non-annular shape, so as to surround the first side 51S of the first split bone part 51 over only part of the circumferential direction of the first split bone part 51, as in the examples of FIGS. 9A to 10, or it may be configured in an annular shape, so as to surround the first side 51S of the first split bone part 51 over the entire circumference of the first split bone part 51.

Additionally, when the porous structural body 1 is in its natural state, the second side 52S of the second split bone part 52 may surround the first side 51S of the first split bone part 51 as in the example of FIGS. 9A, 9B, but may not surround the first side 51S of the first split bone part 51.

According to the fourth embodiment, in at least one (preferably all) of the non-continuous bone parts 2BB, the second side 52S of the second split bone part 52 is configured to surround the first side 51S of the first split bone part 51 along the circumferential direction of the first split bone part 51, at least when the porous structural body 1 is compressed to deform in the predetermined weight input direction ID. Accordingly, compared to the first embodiment, the contact area between the first and second sides 51S, 52S can be increased, and in turn, the amount of friction generated between the first and second sides 51S, 52S can be increased. When the porous structural body 1 is compressed to deform in the predetermined weight input direction ID, the first side 51S slides on the second side 52S while being guided by the second side 52S, so that the first and second split bone parts 51S, 52S can more reliably rub against each other.

In the example of FIG. 9A, 9B, in the at least one (preferably all) of the non-continuous bone parts 2BB, the first split bone part 51 is cylindrical, whereby the first side 51S is a ridge surface corresponding to the cylindrical shape, and the second side 52S of the second split bone part 52 is a groove surface corresponding to the cylindrical shape.

The first and second sides 51S, 52S may, however, have any shapes.

For example, as in the first modification of FIG. 10, in the at least one (preferably all) of the non-continuous bone parts 2BB, the first split bone part 51 may have a quadrilateral prism shape, whereby the first side 51S may be a ridge surface corresponding to the quadrilateral tubular shape, and the second side 52S of the second split bone part 52 may be a groove surface corresponding to the quadrilateral tubular shape.

Fifth Embodiment of Porous Structural Body

Figure 11A:
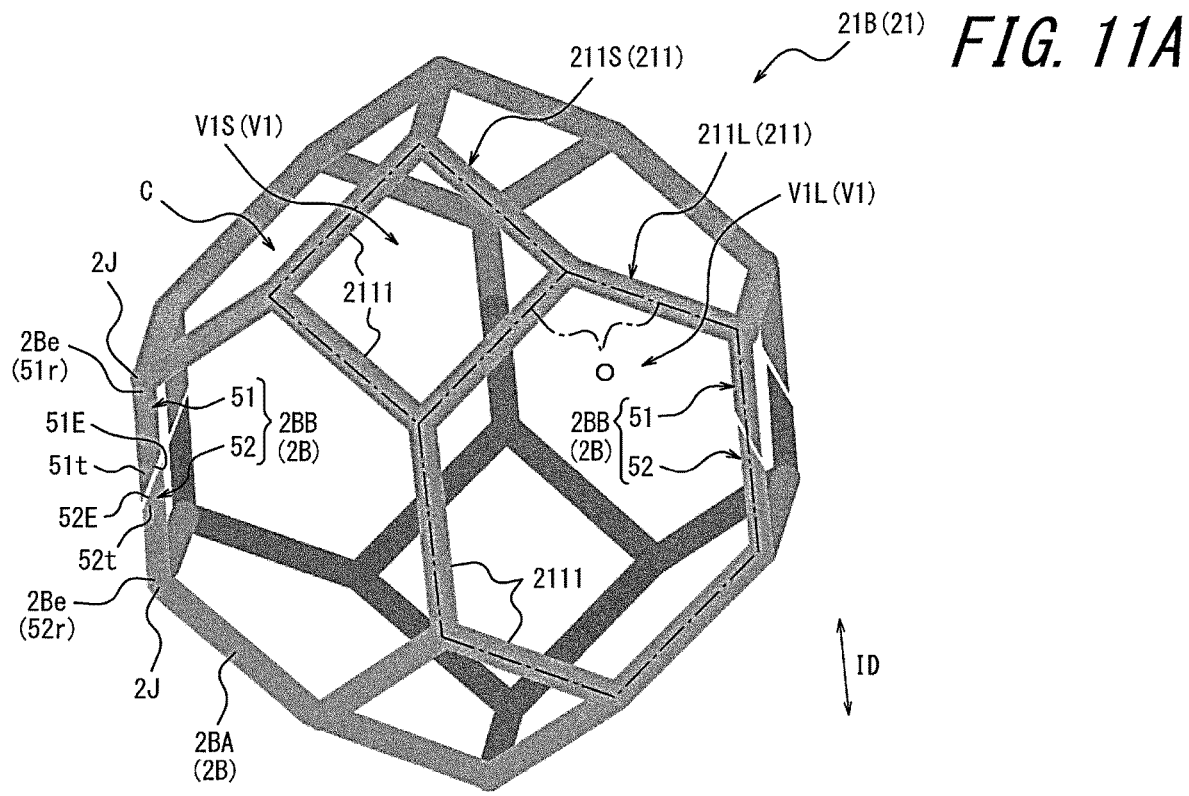
FIG. 11A is a perspective view illustrating a cell defining part with non-continuous bone parts in a porous structural body according to a fifth embodiment of the present disclosure.
Figure 11B:
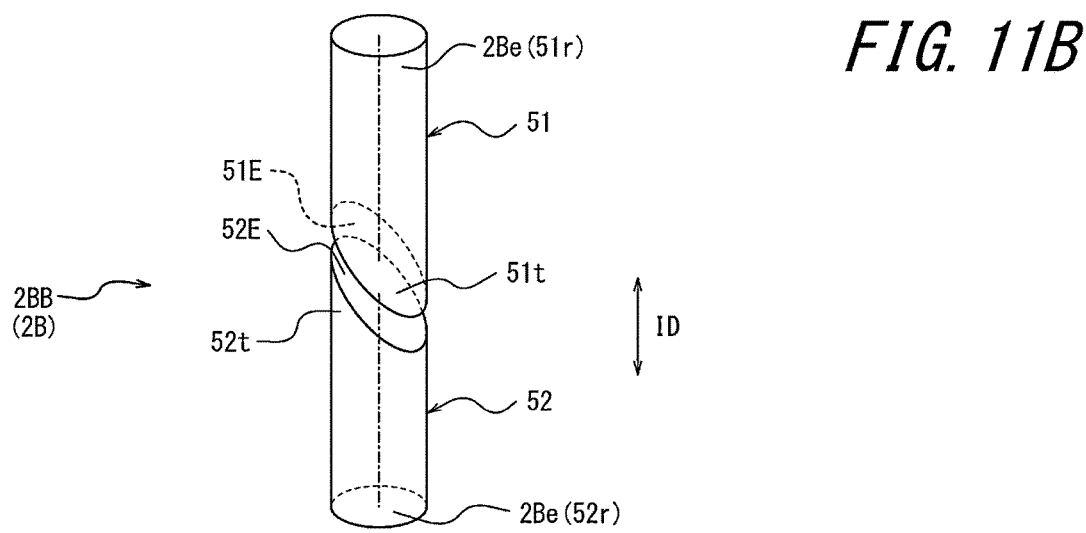
FIG. 11B illustrates a non-continuous bone part in the porous structural body of FIG. 11A.

FIGS. 11A, 11B illustrate the porous structural body 1 according to a fifth embodiment of the present disclosure.

In the fifth embodiment, as in the first embodiment, the porous structural body 1 is configured such that the first and second split bone parts 51, 52 in at least one (preferably all) of the non-continuous bone parts 2BB rub against each other when the porous structural body 1 is compressed to deform in a predetermined weight input direction ID. Accordingly, the porous structural body 1 is configured such that friction is generated between the first and second split bone parts 51, 52 in the at least one (preferably all) of the non-continuous bone parts 2BB when the porous structural body 1 is compressed to deform in the predetermined weight input direction ID.

In the fifth embodiment, as in the first embodiment, the first and second split bone parts 51, 52 are preferably each columnar.

In the first embodiment (FIGS. 1 to 5B), as described above, the porous structural body 1 is configured such that the first side 51S of the first split bone part 51 and the second side 52S of the second split bone part 52 in at least one (preferably all) of the non-continuous bone parts 2BB rub against each other when the porous structural body 1 is compressed to deform in the predetermined weight input direction ID. In contrast, in the fifth embodiment (FIGS. 11A, 11B), in at least one (in the example in the figures, all) of the non-continuous bone parts 2BB, the first split bone part 51 has, at its end portion (tip portion) 51$t$ in the direction of extension of the first split bone part 51, a first end surface 51E inclined with respect to a direction perpendicular to the direction of extension of the first split bone part 51, and the second split bone part 52 has, at its end portion (tip portion) 52$t$ in the direction of extension of the second split bone part 52, a second end surface 52E inclined with respect to a direction perpendicular to the direction of extension of the second split bone part 52, and the first and second end surfaces 51E, 52E are substantially parallel to each other. The porous structural body 1 is configured such that the first end surface 51E of the first split bone part 51 and the second end surface 52E of the second split bone part 52 in the at least one (in the example in the figures, all) of the non-continuous bone parts 2BB rub against each other when the porous structural body 1 is compressed to deform in the predetermined weight input direction ID. Accordingly, the porous structural body 1 is configured such that friction is generated between the first end surface 51E of the first split bone part 51 and the second end surface 52E of the second split bone part 52 in the at least one (preferably all) of the non-continuous bone parts 2BB when the porous structural body 1 is compressed to deform in the predetermined weight input direction ID. The "direction of extension of the first split bone part 51" is a direction parallel to the central axis of the first split bone part 51 (indicated by a single dotted line in FIG. 11B). The "direction of extension of the second split bone part 52" is a direction parallel to the central axis of the second split bone part 52 (indicated by a single dotted line in FIG. 11B).

When the porous structural body 1 is in its natural state, the first end surface 51E and the second end surface 52E preferably face each other, as illustrated in FIGS. 11A, 11B. When the porous structural body 1 is in its natural state, the first end surface 51E and the second end surface 52E may be out of contact with each other as illustrated in the example of FIGS. 11A, 11B, or they may be in contact with each other.

According to the fifth embodiment, in at least one (in the example in the figures, all) of the non-continuous bone parts 2BB, the first split bone part 51 has, at its end portion (tip portion) 51$t$ in the direction of extension of the first split bone part 51, the first end surface 51E inclined with respect to the direction perpendicular to the direction of extension of the first split bone part 51, and the second split bone part 52 has, at its end portion (tip portion) 52$t$ in the direction of extension of the second split bone part 52, the second end surface 52E inclined with respect to the direction perpendicular to the direction of extension of the second split bone part 52, and the first and second end surfaces 51E, 52E are substantially parallel to each other. This makes it easier for the first and second end surfaces 51E, 52E to rub against each other. Furthermore, it can be ensured that the contact area between the first and second end surfaces 51E, 52E increases, and this in turn can ensure that the amount of friction generated between the first and second sides 51S, 52S increases.

Sixth Embodiment of Porous Structural Body

Figure 12A:
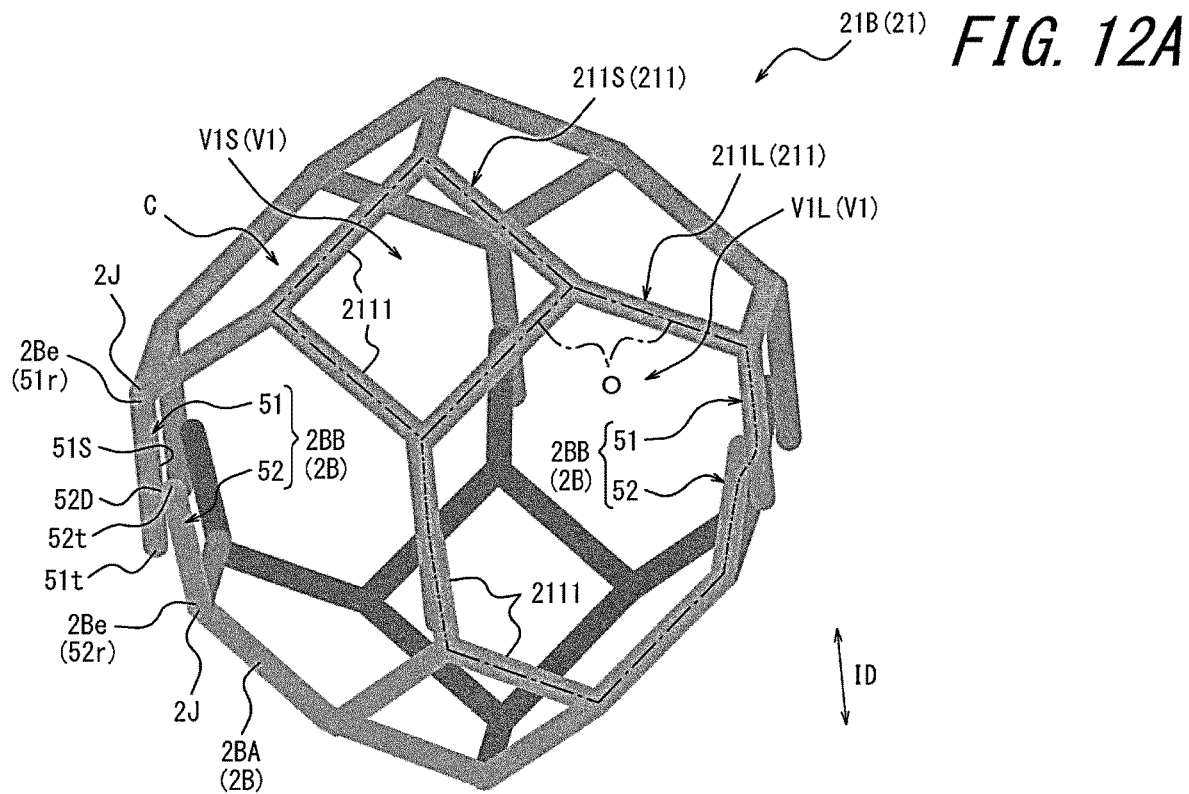
FIG. 12A is a perspective view illustrating a cell defining part with non-continuous bone parts in a porous structural body according to a sixth embodiment of the present disclosure.
Figure 12B:
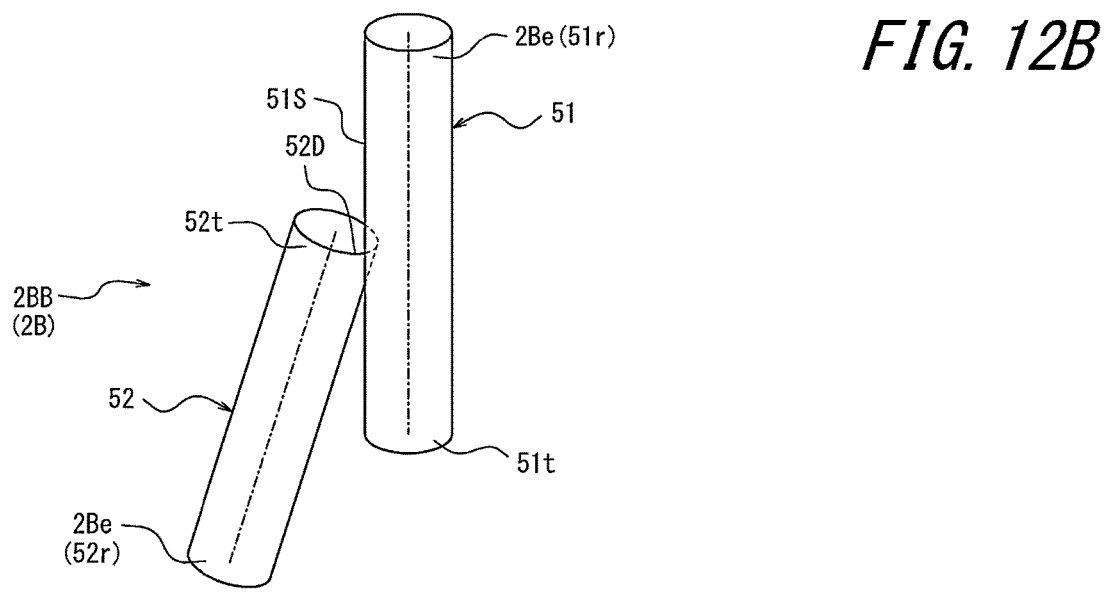
FIG. 12B illustrates a non-continuous bone part in the porous structural body of FIG. 12A.

FIGS. 12A, 12B illustrate the porous structural body 1 according to a sixth embodiment of the present disclosure.

In the sixth embodiment, as in the first embodiment, the porous structural body 1 is configured such that the first and second split bone parts 51, 52 in at least one (preferably all) of the non-continuous bone parts 2BB rub against each other when the porous structural body 1 is compressed to deform in a predetermined weight input direction ID. Accordingly, the porous structural body 1 is configured such that friction is generated between the first and second split bone parts 51, 52 in the at least one (preferably all) of the non-continuous bone parts 2BB when the porous structural body 1 is compressed to deform in the predetermined weight input direction ID.

In the sixth embodiment, as in the first embodiment, the first and the second split bone parts 51, 52 are each preferably columnar.

In the first embodiment (FIGS. 1 to 5B), the direction of extension of the first split bone part 51 and the direction of extension of the second split bone part 52 in at least one (preferably all) of the non-continuous bone parts 2BB are parallel to each other. In contrast, in the sixth embodiment (FIGS. 12A, 12B), the direction of extension of the first split bone part 51 and the direction of extension of the second split bone part 52 in at least one (preferably all) of the non-continuous bone parts 2BB are non-parallel to each other. The porous structural body 1 is configured such that the first side 51S of the first split bone part 51 and an edge portion 52D of the second split bone part 52 in at least one (preferably all) of the non-continuous bone parts 2BB rub against each other (at this time, the edge portion 52D scratches the first side 51S, or the first side 51S scratches the edge portion 52D) when the porous structural body 1 is compressed to deform in the predetermined weight input direction ID. Accordingly, the porous structural body 1 is configured such that friction is generated between the first side 51S and the edge portion 52D in the at least one (preferably all) of the non-continuous bone parts 2BB when the porous structural body 1 is compressed to deform in the predetermined weight input direction ID. The "direction of extension of the first split bone part 51" is a direction parallel to the central axis of the first split bone part 51 (indicated by a single dotted line in FIG. 12B). The "direction of extension of the second split bone part 52" is a direction parallel to the central axis of the second split bone part 52 (indicated by a single dotted line in FIG. 12B). In the present embodiment, the "first side 51S of the first split bone part 51" refers to a portion of the side of the first split bone part 51 that is configured to rub against the edge portion 52D of the second split bone part 52. The "edge portion 52D" of the second split bone part 52 refers to an edge portion between the side of the second split bone part 52 and an end surface of the second split bone part 52 that is located near the tip portion 52t.

When the porous structural body 1 is in its natural state, the first side 51S and the edge portion 52D may be in contact with each other as in the example of FIGS. 12A, 12B, or they may be out of contact with each other.

According to the sixth embodiment, the direction of extension of the first split bone part 51 and the direction of extension of the second split bone part 52 in at least one (preferably all) of the non-continuous bone parts 2BB are non-parallel to each other, and the porous structural body 1 is configured such that the first side 51S of the first split bone part 51 and the edge portion 52D of the second split bone part 52 rub against each other (at this time, the edge portion 52D scratches the first side 51S) in the at least one (preferably all) of the non-continuous bone parts 2BB when the porous structural body 1 is compressed to deform in the predetermined weight input direction ID. Accordingly, it can be ensured that the amount of friction generated between the first side 51S and the edge portion 52D increases.

Seventh Embodiment of Porous Structural Body

Figure 13:
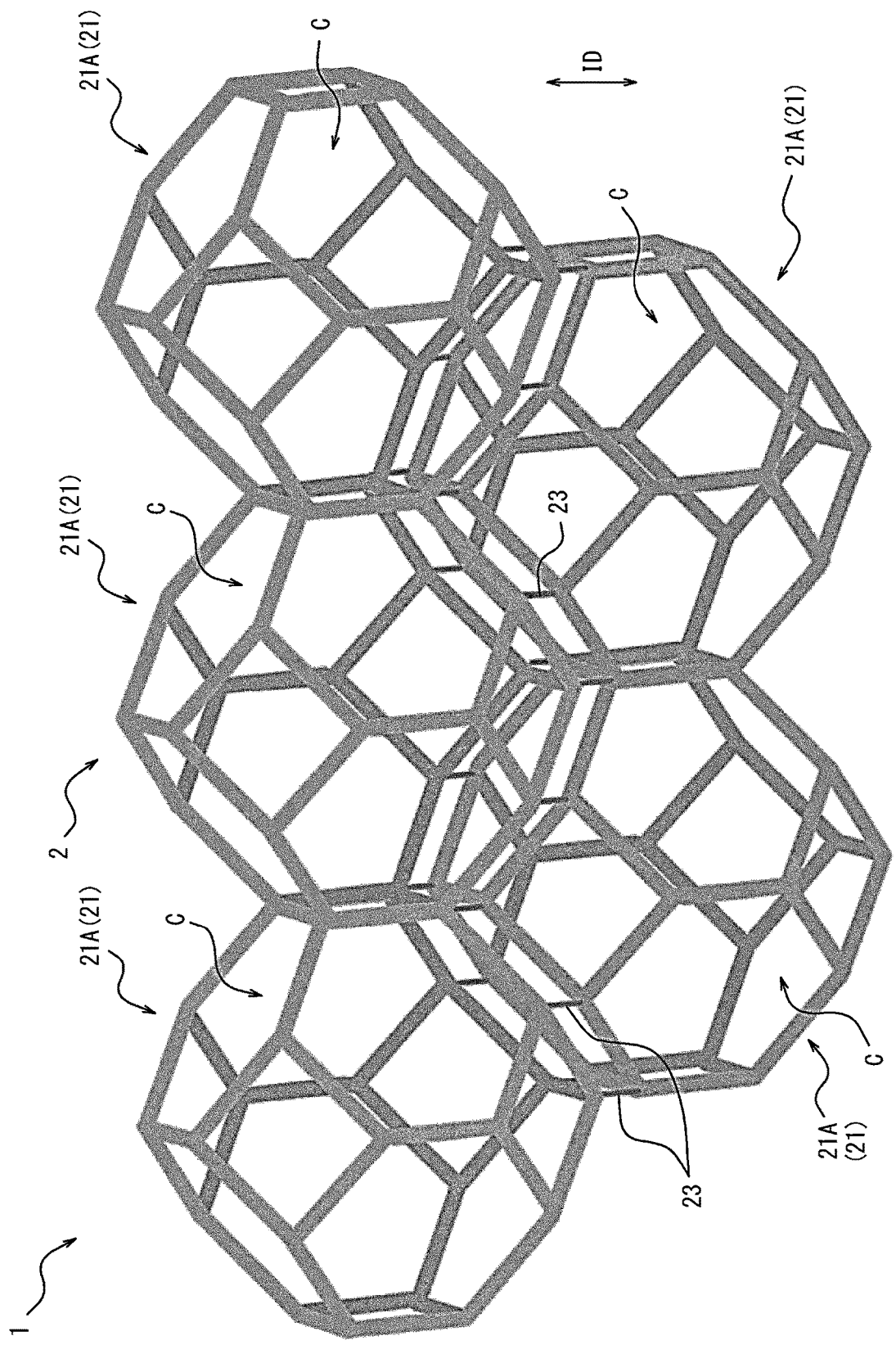
FIG. 13 is a perspective view illustrating part of a porous structural body according to a seventh embodiment of the present disclosure in a natural state in which compressive deformation has not occurred.
Figure 14:
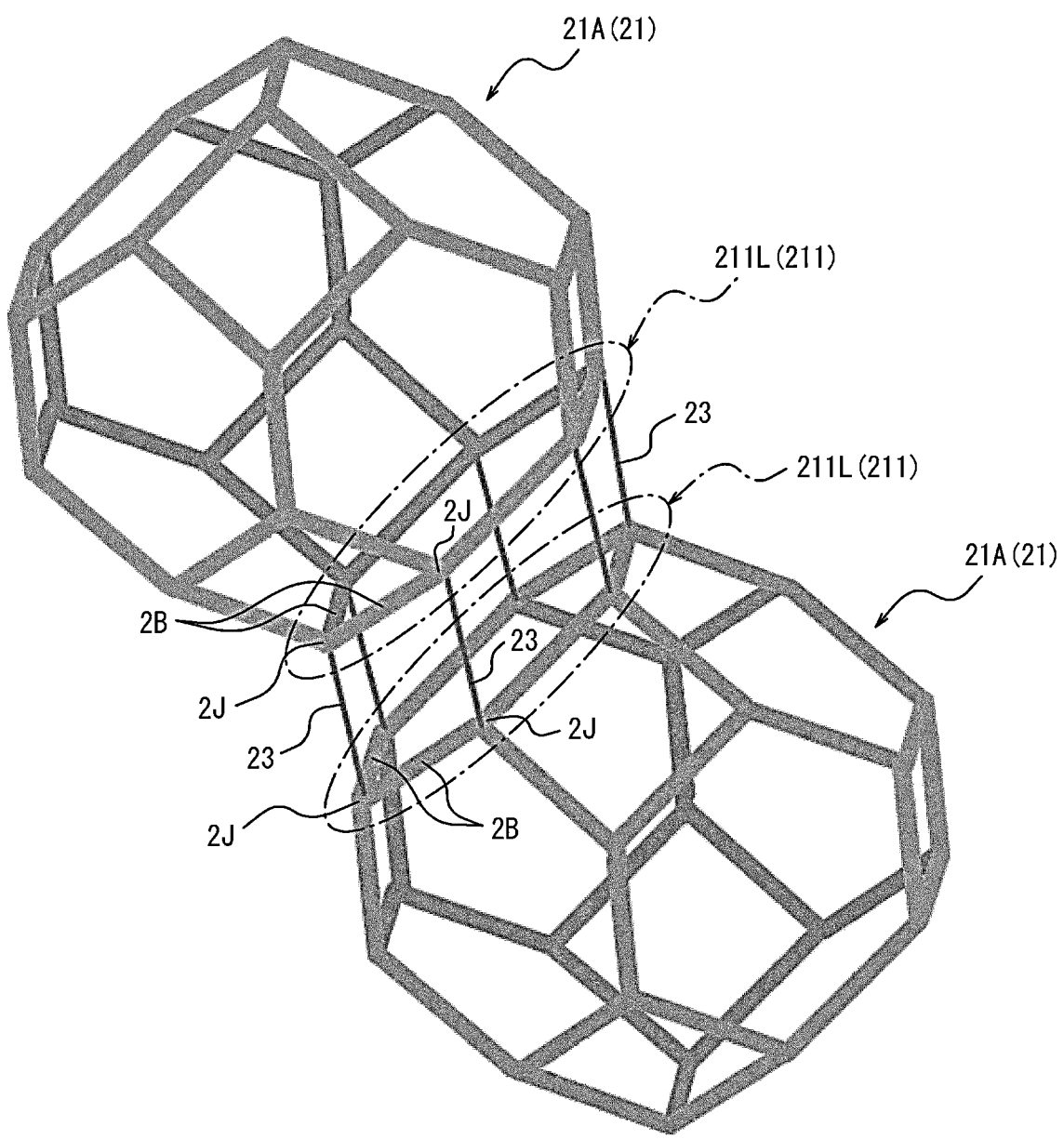
FIG. 14 is a perspective view illustrating part of the porous structural body of FIG. 13 in a state in which bridge parts are stretched for convenience.
Figure 15:
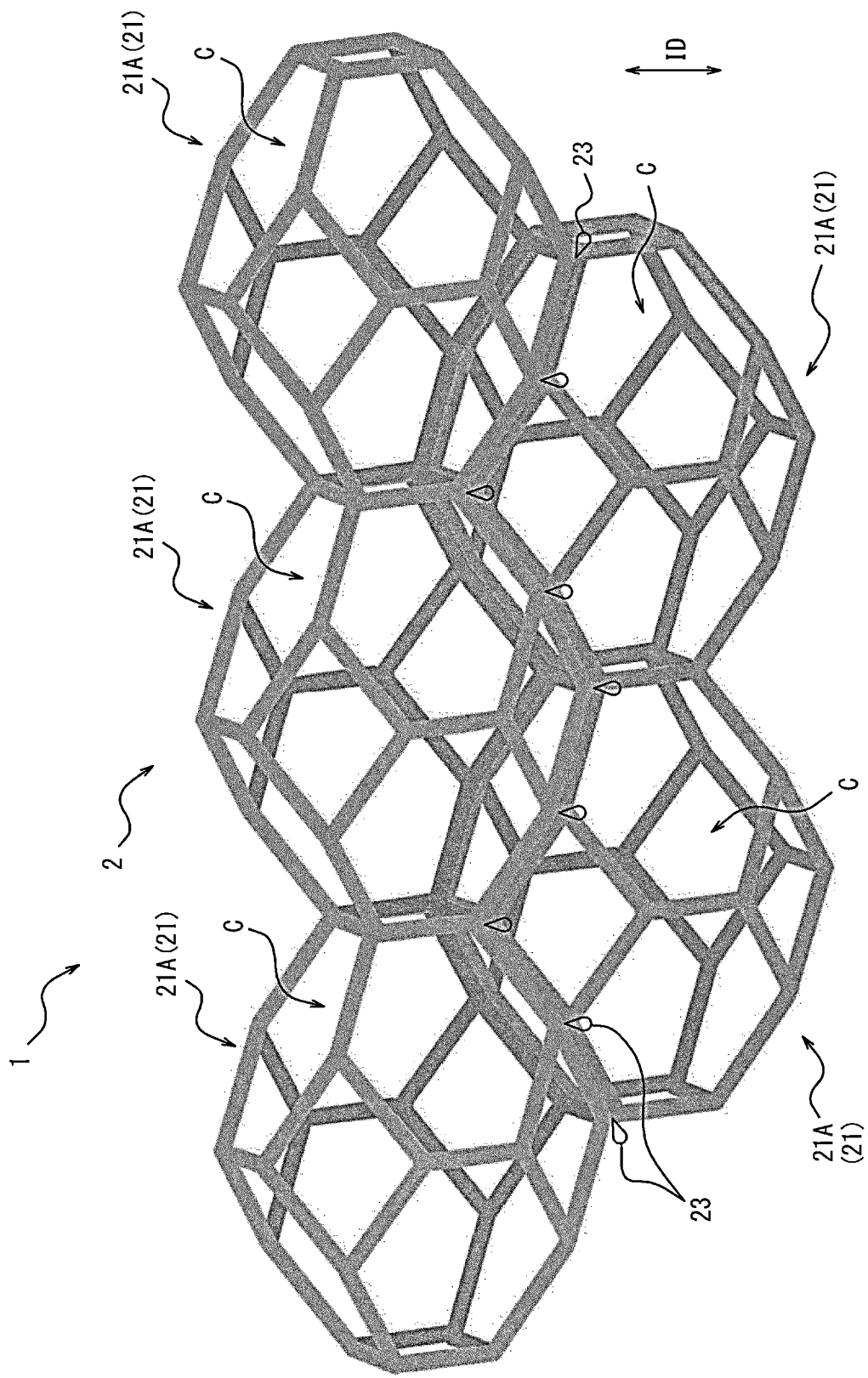
FIG. 15 is a perspective view illustrating the porous structural body of FIG. 13 in a state in which compressive deformation has occurred in a predetermined weight input direction.

FIGS. 13 to 15 illustrate the porous structural body 1 according to a seventh embodiment of the present disclosure. FIG. 13 is a perspective view illustrating part of the porous structural body 1 according to the seventh embodiment of the present disclosure in a natural state in which compressive deformation has not occurred. FIG. 14 is a perspective view illustrating part of the porous structural body 1 of FIG. 13 in a state in which bridge parts 23, which will be described later, are stretched for convenience. FIG. 15 is a perspective view illustrating the porous structural body 1 of FIG. 13 in a state in which compressive deformation has occurred in a predetermined weight input direction ID.

In the first embodiment (FIGS. 1 to 5B), as described above, the porous structural body 1 is configured such that the first and second split bone parts 51, 52 in at least one (preferably all) of the non-continuous bone parts 2BB rub against each other when the porous structural body 1 is compressed to deform in the predetermined weight input direction ID. In contrast, in the seventh embodiment (FIGS. 13 to 15), the porous structural body 1 is configured such that when the porous structural body 1 is compressed to deform in the predetermined weight input direction ID, two or more cell defining parts 21 in the plurality of cell defining parts 21 included in the skeleton part 2 (specifically, two adjacent cell defining parts 21 in the two or more cell defining parts 21) interfere with each other. More specifically, when the porous structural body 1 is compressed to deform in the predetermined weight input direction ID, a plurality of portions of the two or more cell defining parts 21 that are previously out of contact with each other collide with each other (immediately after colliding, the plurality of portions may remain in contact without moving, or they may remain in contact while moving). Accordingly, when the porous structural body 1 is compressed to deform in the predetermined weight input direction ID, friction is generated between the two or more cell defining parts 21.

In the first embodiment (FIGS. 1 to 5), as described above, each annular part 211 is shared by a pair of cell defining parts 21 adjacent to the annular part 211 (i.e. a pair of cell defining parts 21 between which the annular part 211 is sandwiched). In other words, a pair of cell defining parts 21 adjacent to each other share one annular part 211. On the other hand, in the examples of FIGS. 13 to 15, a pair of adjacent cell defining parts 21 that are configured to interfere with each other do not share one annular part 211, but they each have a separate annular part 211 in their respective portions adjacent to each other (FIG. 14), and the pair of annular parts 211 are configured to interfere with each other.

When the porous structural body 1 is in its natural state, the plurality of portions (in the examples of FIGS. 13 to 15, the pair of annular parts 211) that are configured to interfere with each other preferably face each other without being in contact.

Although in the examples of FIGS. 13 to 15 each of the plurality of cell defining parts 21 included in the skeleton part 2 is a cell defining part 21A without non-continuous bone parts 2BB, some or all of the plurality of cell defining parts 21 included in the skeleton part 2 may be cell defining parts 21B with one or a plurality of non-continuous bone parts 2BB according to any embodiment described herein.

According to the seventh embodiment, similar effects to those of the first embodiment can be obtained.

In the seventh embodiment, it is preferable for the skeleton part 2 to further include one or a plurality of bridge parts 23 that couple the two or more cell defining parts 21 configured to interfere with each other. This allows the two or more cell defining parts to be integrated together via the bridge parts 23. In turn, when the porous structural body 1 is in its natural state, the positional relationship between the two or more cell defining parts 21 can be maintained as expected by the bridge parts 23. It also makes it easier for the porous structural body 1 to be shaped by a 3D printer.

Each bridge part 23 is preferably configured in a columnar shape. From the viewpoint of making the bridge parts 23 easier to deform and thereby making it easier for the two or more cell defining parts 21 to interfere with each other, the cross-sectional area of each bridge part 23 (cross-sectional area along a direction perpendicular to the central axis of the bridge part 23) is preferably smaller than the minimum cross-sectional area of each bone part 2B, although it may be larger than or equal to the minimum cross-sectional area of the bone part 2B.

In the examples of FIGS. 13 to 15, each bridge part 23 couples a pair of connection parts 2J in a pair of cell defining parts 21 adjacent to it (FIG. 14). This allows the bridge part 23 to more reliably maintain the positional relationship between the pair of cell defining parts 21 when the porous structural body 1 is in its natural state. Each bridge part 23 may, however, couple any portions in a pair of cell defining parts 21 adjacent to it.

The above-described embodiments may be combined as appropriate.

For example, the configurations of non-continuous bone parts 2BB according to several embodiments in the first to sixth embodiments may be adopted in a plurality of different non-continuous bone parts 2BB in the porous structural body 1.

Furthermore, the configurations of non-continuous bone parts 2BB according to one or a plurality of embodiments in the first to sixth embodiments may be united with the configuration according to the seventh embodiment in the porous structural body 1.

Moreover, in one single non-continuous bone part 2BB included in the porous structural body 1, the plurality of protrusions P according to the third embodiment may be applied to the first side 51S and/or the second side 52S according to any of the first, second, and fourth embodiments, to the first end surface 51E and/or the second end surface 52E according to the fifth embodiment, or to the first side 51S according to the sixth embodiment.

Eighth Embodiment of Porous Structural Body

Figure 16:
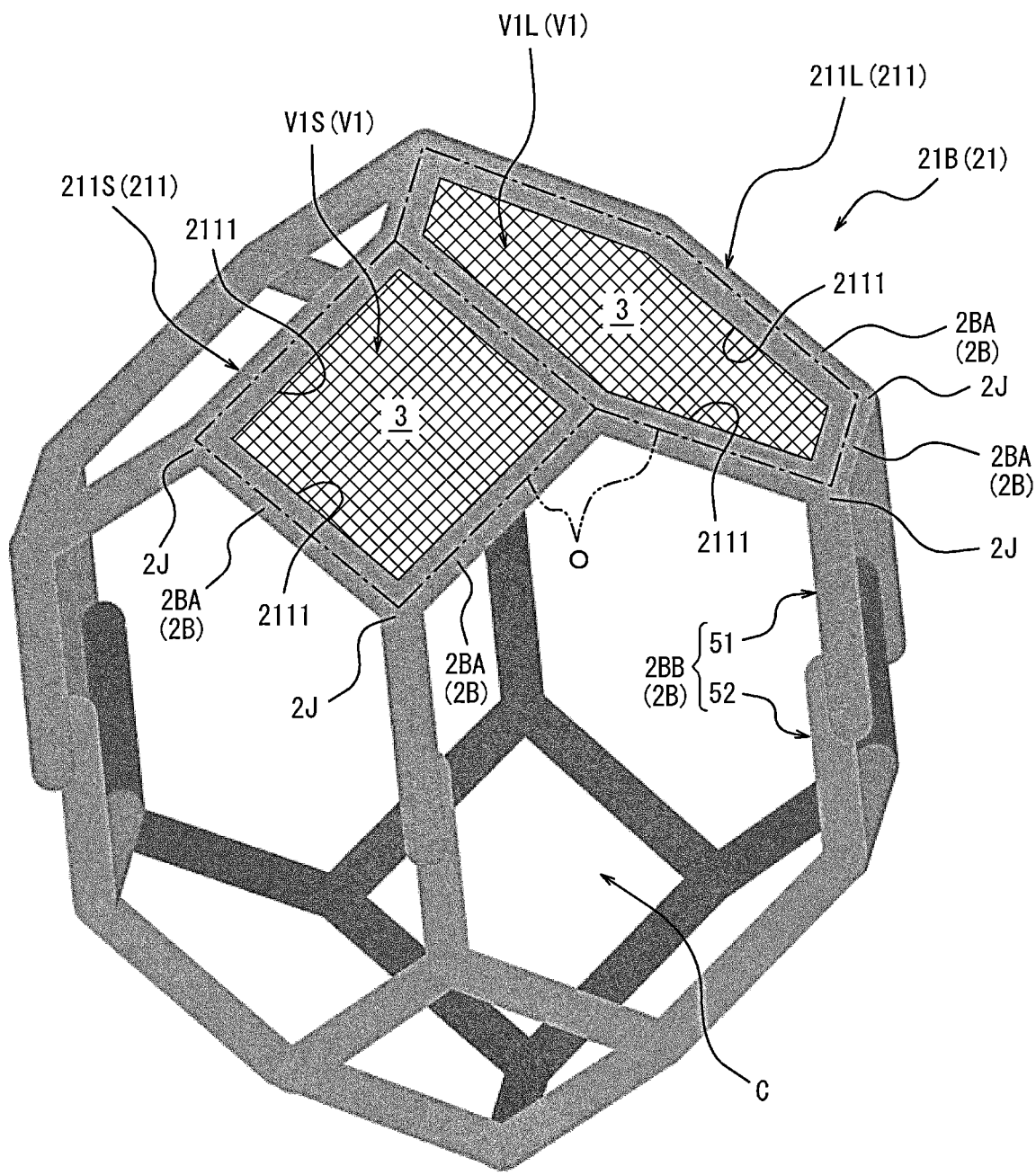
FIG. 16 is a perspective view illustrating a cell defining part in a porous structural body according to an eighth embodiment of the present disclosure.

FIG. 16 illustrates the porous structural body 1 according to an eighth embodiment of the present disclosure. The configuration described in the eighth embodiment can be suitably applied to the porous structural body 1 according to any of the first to seventh embodiments described above.

In the present embodiment, the porous structural body 1 includes one or a plurality of films 3, in addition to the skeleton part 2.

Each film 3 extends over the virtual surface V1 defined by the annular inner peripheral edge portion 2111 of the corresponding annular part 211, thereby covering the virtual surface V1 defined by the annular part 211. In the porous structural body 1 according to the example of FIG. 16, at least one of the virtual surfaces V1 included in the skeleton part 2 is covered with a film 3. The film 3 is made of the same material as the skeleton part 2 and is integrally configured with the skeleton part 2. In the example of FIG. 16, the film 3 is configured to be flat. The film 3 may, however, be configured to be non-flat (e.g. arched [curved]).

Each film 3 preferably has a thickness smaller than the width W0 (FIG. 4A) of a continuous bone part 2BA.

Each film 3 prevents two cell holes C between which the virtual surface V1 is sandwiched from communicating through the virtual surface V1, thereby preventing air from passing through the virtual surface V1, which in turn reduces the breathability of the porous structural body 1 as a whole. By adjusting the number of virtual surfaces V1 covered with a film 3 among those included in the porous structural body 1, the breathability of the porous structural body 1 as a whole can be adjusted, and various breathability levels can be achieved according to requirements. It is not preferable for all the virtual surfaces V1 included in the porous structural body 1 to be covered with a film 3. In other words, it is preferable for at least one of the virtual surfaces V1 included in the porous structural body 1 to be exposed, without being covered with a film 3.

As mentioned above, conventional porous structural bodies are manufactured through a process of foaming by chemical reaction, and it has been difficult to form a desired number of films at desired positions over communication holes through which cells are communicated. In a case in which the porous structural body 1 is manufactured using a 3D printer as in this example, it can be ensured that a desired number of films 3 are formed at desired positions, by including information on the films 3 in advance in the 3D shaping data to be loaded into the 3D printer.

At least one of the small virtual surfaces V1S included in the skeleton part 2 may be covered with a film 3, and/or, at least one of the large virtual surfaces V1L included in the skeleton part 2 may be covered with a film 3.

In a case in which the skeleton part 2 includes non-continuous bone parts 2BB, each film 3 preferably covers a virtual surface V1 defined by an annular part 211 without non-continuous bone parts 2BB (i.e. an annular part 211 in which all the bone parts 2B are continuous bone parts 2BA), from the viewpoint of preventing the rubbing movement of the non-continuous bone parts 2BB by the films 3.

[Seat Pad Including Porous Structural Body]

As described above, the porous structural body 1 according to each embodiment of the present disclosure can be used in a seat pad (in particular, a car seat pad).

Figure 17:
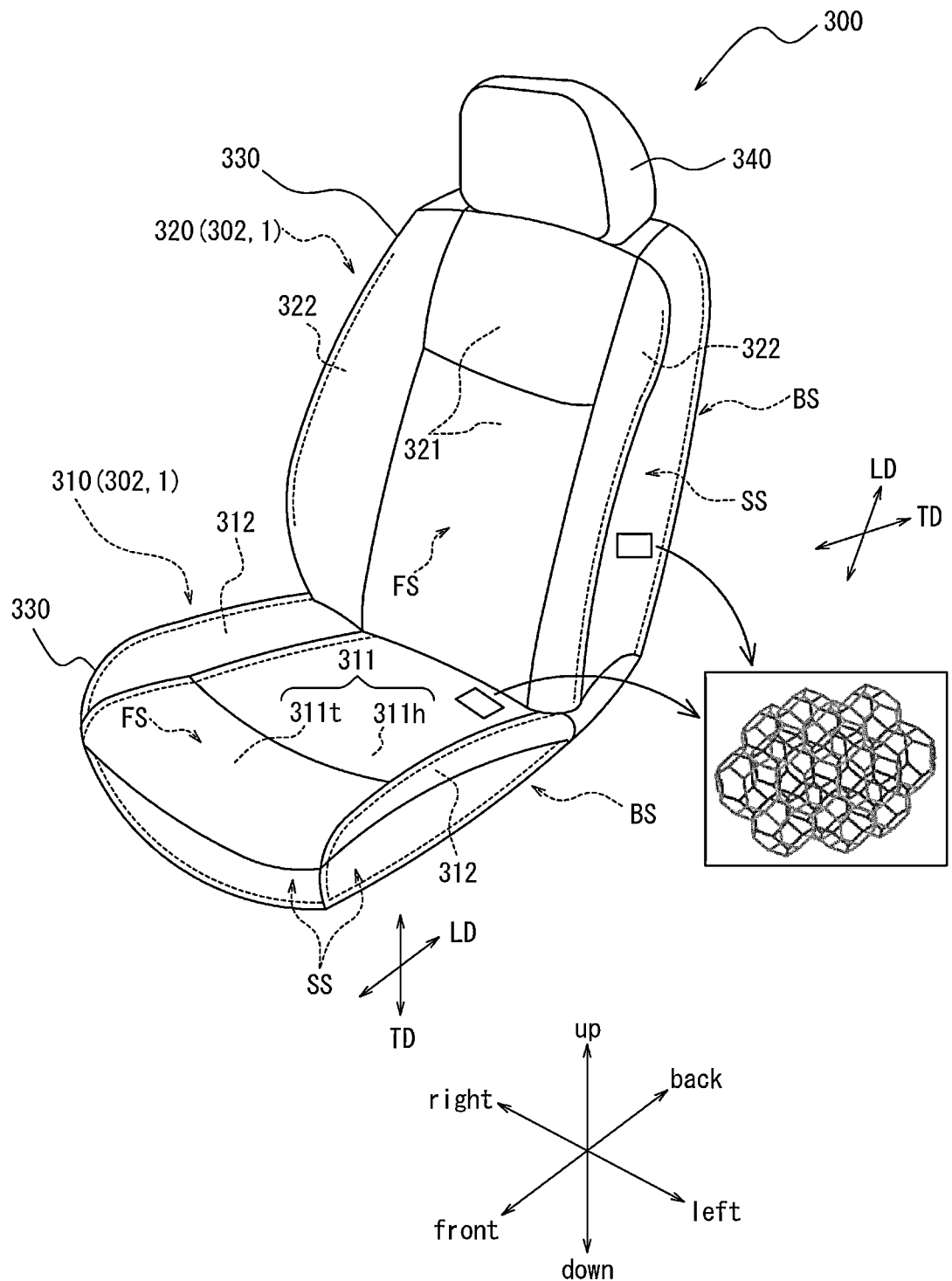
FIG. 17 is a perspective view illustrating a car seat that can include a porous structural body according to any embodiment of the present disclosure.

With reference to FIG. 17, an example of a seat pad 302 that can include the porous structural body 1 according to any of the embodiments of the present disclosure will be described below.

FIG. 17 is a perspective view illustrating an example of a car seat 300 including the seat pad 302 (car seat pad), which can be formed of the porous structural body 1 according to various embodiments of the present disclosure.

As illustrated by dashed lines in FIG. 17, the car seat 300 includes a cushion pad 310 for a seated person to sit on, and a back pad 320 for supporting the back of the seated person. The cushion pad 310 and the back pad 320 are each formed by the seat pad 302. In the following, the cushion pad 310 or the back pad 320 may be referred to simply as the "seat pad 302." The cushion pad 310 and the back pad 320 can each be formed of the porous structural body 1 according to any embodiment described herein. In addition to the seat pad 302 that forms each of the cushion pad 310 and the back pad 320, the car seat 300 may include, for example, a skin 330 that covers the front side (seat person's side) of the seat pad 302, a frame (not illustrated) that supports the cushion pad 310 from below, a frame (not illustrated) installed on the back side of the back pad 320, and a headrest 340 installed on the upper side of the back pad 320 so as to support the head of the seated person. The skin 330 is formed of, for example, a breathable material (such as fabric). Although in the example of FIG. 17 the cushion pad 310 and the back pad 320 are configured as separate components, they can be configured as a single component.

Furthermore, although in the example of FIG. 17 the headrest 340 and the back pad 320 are configured as separate components, the headrest 340, together with the back pad 320, may be configured as a single component.

Herein, as indicated in FIG. 17, the directions "up", "down", "left", "right", "front", and "back" as viewed from a seated person seated on the car seat 300 (and thus the seat pad 302) are simply referred to as, for example, "up", "down", "left", "right", "front", and "back", respectively.

The cushion pad 310 includes a main pad 311 configured to support the hips and thighs of a seated person from below, and a pair of side pads 312 that are positioned on both the right and left sides of the main pad 311 and are configured to bulge upward from the main pad 311 so as to support the seated person from both the right and left sides. The main pad 311 has an under-thigh part 311t, which is configured to support the thighs of the seated person from below, and an under-hip part 311h, which is positioned behind the under-thigh part 311t and configured to support the hips of the seated person from below.

The back pad 320 includes a main pad 321 configured to support the back of the seated person from behind, and a pair of side pads 322 that are positioned on both the right and left sides of the main pad 321 and are configured to bulge forward from the main pad 321 so as to support the seated person from both the right and left sides.

Herein, a "direction of extension (LD) of the seat pad (302)" refers to a direction perpendicular to a left-and-right direction and a thickness direction (TD) of the seat pad 302. In the case of the cushion pad 310, it refers to a front-and-back direction (FIG. 17), and in the case of the back pad 320, it refers to a direction in which the main pad 321 of the back pad 320 extends from a lower surface to an upper surface of the main pad 321 (FIG. 17).

The "thickness direction (TD) of the seat pad (302)" refers to an up-and-down direction in the case of the cushion pad 310 (FIG. 17), and in the case of the back pad 320, it refers to a direction in which the main pad 321 of the back pad 320 extends from a surface on the seated person's side (front side) FS to the back side BS of the main pad 321 (FIG. 17).

The "surface on the seated person's side (front side or FS)" of the seat pad (302) refers to an upper surface in the case of the cushion pad 310 (FIG. 17), and it refers to a front surface in the case of the back pad 320 (FIG. 17). The "back side (BS)" of the seat pad (302) is the side of the seat pad (302) opposite to the surface on the seated person's side (FS), and in the case of the cushion pad 310, it refers to a lower surface in the case of the cushion pad 310 (FIG. 17), and in the case of the back pad 320, it refers to a back surface (FIG. 17). The "lateral side (SS)" of the seat pad (302) is the side located between the surface on the seated person's side (FS) and the back side (BS) of the seat pad (302), and in the case of the cushion pad 310, it refers to any one of front, back, left, and right surfaces (FIG. 17), and in the case of the back pad 320, it refers to any one of lower, upper, left, and right surfaces (FIG. 17).

The porous structural body 1 is preferably orientated such that the predetermined weight input direction ID coincides with the thickness direction TD of the seat pad 302.

In the example of FIG. 17, the porous structural body 1 forms the entire cushion pad 310 and the entire back pad 320 of the seat pad 302.

The porous structural body 1 may, however, form only one of the cushion pad 310 of the seat pad 302, the back pad 320 of the seat pad 302, and the headrest 340.

The porous structural body 1 may also form only part of the cushion pad 310 of the seat pad 302, only part of the back pad 320 of the seat pad 302, and/or only part of the headrest 340. This can reduce the size of the porous structural body 1, which in turn allows it to be manufactured by a relatively small 3D printer. In that case, parts of the cushion pad 310 of the seat pad 302, the back pad 320 of the seat pad 302, and the headrest 340, other than the parts formed of the porous structural body 1, may be formed of a conventional typical porous structural body (foamed body) as mentioned above that is manufactured through a process of foaming by a chemical reaction in, for example, metallic molding or slab molding. For example, although not illustrated, the cushion pad 310 of the seat pad 302, the back pad 320 of the seat pad 302, and/or the headrest 340 may include a plurality of cushion parts that are configured separately from each other, and only some (one or a plurality) of the plurality of cushion parts may be formed of the porous structural body 1, and the remaining cushion parts may be formed of a porous structural body (foamed body) manufactured through a process of foaming by chemical reaction in, for example, metallic molding or slab molding. More specifically, for example, the cushion pad 310 of the seat pad 302, the back pad 320 of the seat pad 302, and/or the headrest 340 may each include a filling body formed of one or a plurality of porous structural bodies 1, and a body part that is configured separately from the one or more filling bodies, that includes a concave part for accommodating the one or more filling bodies, and that is formed of a porous structural body (foamed body) manufactured through a process of foaming by chemical reaction in, for example, metallic molding or slab molding.

Alternatively, the cushion pad 310 of the seat pad 302, the back pad 320 of the seat pad 302, and/or the headrest 340 may be configured by a plurality of cushion parts configured separately from each other, and each of the plurality of cushion parts may be formed of the porous structural body 1. This can also reduce the size of the porous structural body 1, which in turn allows it to be manufactured by a relatively small 3D printer.

The porous structural body 1 preferably forms at least part of the main pad 311 of the cushion pad 310 or the main pad 321 of the back pad 320.

[Method for Manufacturing Porous Structural Body]

Now, with reference to FIG. 18, a method for manufacturing the porous structural body 1 according to the present disclosure will be described by way of example. The method described below is a method for manufacturing the porous structural body 1 using a 3D printer and can be suitably used to manufacture the porous structural body 1 according to any embodiment described herein. FIG. 18 illustrates how the porous structural body 1 that is to form a seat pad is manufactured.

First, 3D shape data (e.g. 3D CAD data) representing the 3D shape of the porous structural body 1 is generated in advance using a computer.

Next, the 3D shape data is converted into 3D shaping data 500 using a computer. The 3D shaping data 500 is read by a controller 410 of a 3D printer 400 when a shaping unit 420 of the 3D printer 400 performs shaping, and the controller 410 causes the shaping unit 420 to shape the porous structural body 1. The 3D shaping data 500 includes, for example, slice data representing the 2D shape of each layer of the porous structural body 1.

Then, the porous structural body 1 is shaped by the 3D printer 400. The 3D printer 400 may perform the shaping by using any shaping method, such as an optical shaping method, a powder sintering lamination method, a thermal fusion lamination method (FDM: fused deposition modelling), or an inkjet method. From the viewpoint of productivity, the optical shaping method is preferable. In the shaping illustrated in FIG. 18, the optical shaping method is used.

The 3D printer 400 includes, for example, the controller 410 configured by a CPU or the like, the shaping unit 420 that performs shaping under the control of the controller 410, a supporting table 430 on which an object to be shaped (i.e., the porous structural body 1) is placed, a housing body 440 in which liquid resin LR, the supporting table 430, and the shaped object are housed. The shaping unit 420 has a laser emitter 421 configured to emit a UV laser beam LL in a case in which an optical molding method is used as in this example. The housing body 440 is filled with the liquid resin LR. When the liquid resin LR is cured into flexible resin when being irradiated with the UV laser beam LL emitted by the laser emitter 421.

In thus configured 3D printer 400, the controller 410 first reads the 3D shaping data 500, and based on a 3D shape included in the read 3D shaping data 500, shapes each layer sequentially while controlling the shaping unit 420 to emit the UV laser beam LL.

After the shaping by the 3D printer 400 is completed, the shaped object is removed from the housing body 440. Thus, the porous structural body 1 as the shaped object is finally obtained.

By manufacturing the porous structural body 1 using the 3D printer, the porous structural body 1 can be easily and accurately obtained in a single process, as expected.

In a case in which the porous structural body 1 is made of resin, the porous structural body 1 as a shaped object may be heated in an oven after it has been shaped by the 3D printer 400. In this case, bonding between layers included in the porous structural body 1 can be reinforced, thereby reducing the anisotropy of the porous structural body 1, and thus the cushioning characteristics of the porous structural body 1 can be further improved.

In a case in which the porous structural body 1 is made of rubber, the porous structural body 1 as a shaped object may be vulcanized after it has been shaped by the 3D printer 400.

INDUSTRIAL APPLICABILITY

The porous structural body and the method for manufacturing the porous structural body are suitable for use in cushion members, for example, suitable for use in any vehicle seat and any vehicle seat pad (seat pad), and are particularly suitable for use in car seats and car seat pads.

REFERENCE SIGNS LIST

1 Porous structural body
2 Skeleton part
2B Bone part
2Be End portion of bone part
2BA Continuous bone part
2BB Non-continuous bone part
51 First split bone part
51*t* Tip portion
51*r* Root portion
51S First side
511 Wide side
512 Narrow side
51E First end surface
52 Second split bone part
52*t* Tip portion
52*r* Root portion
52S Second side
521 Wide side
522 Narrow side
52E Second end surface
52D Edge portion
P Protrusion
2J Connection part
21, 21A, 21B Cell defining part
211 Annular part
211L Large annular part
211S Small annular part
2111 Inner peripheral edge portion of annular part
23 Bridge part
3 Film
C Cell hole
O skeleton line
V1 Virtual surface
V1L Large virtual surface
V1S Small virtual surface
ID Predetermined weight input direction
300 Car seat
302 Seat pad
310 Cushion pad
311 Main pad (Seated part)
311*t* Under-thigh part
311*h* Under-hip part
312 Side pad
320 Back pad
321 Main pad
322 Side pad
330 Skin
340 Headrest
FS Surface on seated person's side (front side)
SS Lateral side
BS Back side
TD Thickness direction
LD Direction of extension
400 3D printer
410 Controller
420 Shaping unit
421 Laser emitter
430 Supporting table
440 Housing body
LL UV laser beam
LR Liquid resin
500 3D shaping data

The invention claimed is:

1. A porous structural body made of flexible resin or rubber, the porous structural body comprising
a skeleton part throughout an entirety thereof, wherein the skeleton part includes:
a plurality of bone parts; and
a plurality of connection parts that connect end portions of the plurality of bone parts, wherein
the porous structural body is configured such that a plurality of portions of the skeleton part interfere with each other when the porous structural body is compressed to deform in a predetermined weight input direction, wherein
at least one bone part in the plurality of bone parts is a non-continuous bone part including a first split bone part and a second split bone part into which the non-continuous bone part is divided, and wherein
the porous structural body is configured such that the first split bone part and the second split bone part in the non-continuous bone part rub against each other when the porous structural body is compressed to deform in the predetermined weight input direction.

2. The porous structural body according to claim 1, wherein
in the non-continuous bone part,
the first split bone part has a first side, and
the second split bone part has a second side, and wherein
the porous structural body is configured such that the first side of the first split bone part and the second side of the second split bone part in the non-continuous bone part rub against each other when the porous structural body is compressed to deform in the predetermined weight input direction.

3. The porous structural body according to claim 2, wherein the first split bone part and/or the second split bone part in the non-continuous bone part have/has a strip shape.

4. The porous structural body according to claim 2, wherein the first side and/or the second side in the non-continuous bone part have/has a plurality of protrusions.

5. The porous structural body according to claim 2, wherein, in the non-continuous bone part, the second side is configured to surround the first side along a circumferential direction of the first split bone part when the porous structural body is compressed to deform in the predetermined weight input direction.

6. The porous structural body according to claim 1, wherein
in the non-continuous bone part,
the first split bone part has, at an end portion thereof in a direction of extension of the first split bone part, a first end surface inclined with respect to a direction perpendicular to the direction of extension of the first split bone part,
the second split bone part has, at an end portion thereof in a direction of extension of the second split bone part, a second end surface inclined with respect to a direction perpendicular to the direction of extension of the second split bone part, and
the first end surface and the second end surface are substantially parallel to each other, and wherein
the porous structural body is configured such that the first end surface of the first split bone part and the second end surface of the second split bone part in the non-continuous bone part rub against each other when the porous structural body is compressed to deform in the predetermined weight input direction.

7. The porous structural body according to claim 1, wherein a direction of extension of the first split bone part and a direction of extension of the second split bone part in the non-continuous bone part are non-parallel to each other.

8. The porous structural body according to claim 1, wherein
the skeleton part includes a plurality of cell defining parts that define cell holes inside,
each cell defining part in the plurality of cell defining parts includes a plurality of the bone parts and a plurality of the connection parts, and wherein
the porous structural body is configured such that two or more cell defining parts in the plurality of cell defining parts interfere with each other when the porous structural body is compressed to deform in the predetermined weight input direction.

9. The porous structural body according to claim 8, wherein the skeleton part further includes one or a plurality of bridge parts that couple the two or more cell defining parts.

10. The porous structural body according to claim 1, wherein
the skeleton part includes a plurality of cell defining parts that define cell holes inside,
each cell defining part in the plurality of cell defining parts includes a plurality of annular parts each configured in an annular shape,
the plurality of annular parts included in the cell defining part are coupled to each other so that virtual surfaces defined by respective inner peripheral edge portions of the plurality of annular parts do not intersect with each other,
the plurality of annular parts includes a plurality of the bone parts and a plurality of the connection parts,
the virtual surfaces are each substantially flat, and wherein
the cell holes are defined by the plurality of annular parts and a plurality of the virtual surfaces respectively defined by the plurality of annular parts.

11. The porous structural body according to claim 10, wherein
the plurality of annular parts included in the cell defining part include one or a plurality of small annular parts and one or a plurality of large annular parts,
each small annular part in the plurality of small annular parts has an inner peripheral edge portion that defines a substantially flat small virtual surface, and wherein
each large annular part in the plurality of large annular parts has an inner peripheral edge portion that defines a large virtual surface that is substantially flat and that has a larger area than the small virtual surface.

12. The porous structural body according to claim 11, wherein the small virtual surface and the large virtual surface have different shapes from each other.

13. The porous structural body according to claim 10, wherein the cell holes each have a substantially Kelvin's tetradecahedral shape.

14. The porous structural body according to claim 1, wherein the porous structural body is used in a cushion member.

15. The porous structural body according to claim 1, wherein the porous structural body is shaped by a 3D printer.

16. A porous structural body made of flexible resin or rubber, the porous structural body comprising
a skeleton part throughout an entirety thereof, wherein the skeleton part includes:
a plurality of bone parts; and a plurality of connection parts that connect end portions of the plurality of bone parts, wherein the porous structural body is configured such that a plurality of portions of the skeleton part interfere with each other when the porous structural body is compressed to deform in a predetermined weight input direction, wherein the skeleton part includes a plurality of cell defining parts that define cell holes inside, each cell defining part in the plurality of cell defining parts includes a plurality of the bone parts and a plurality of the connection parts, wherein the porous structural body is configured such that two or more cell defining parts in the plurality of cell defining parts interfere with each other when the porous structural body is compressed to deform in the predetermined weight input direction, wherein the skeleton part further includes one or a plurality of bridge parts that couple the two or more cell defining parts, and wherein each bridge part is configured in a columnar shape.

17. A method for manufacturing the porous structural body according to claim 1, the method comprising manufacturing the porous structural body using a 3D printer.

\* \* \* \* \*